United States Patent
Yang et al.

(10) Patent No.: US 10,962,850 B1
(45) Date of Patent: Mar. 30, 2021

(54) ARRAY SUBSTRATE, DISPLAY PANEL, AND DISPLAY DEVICE

(71) Applicant: Xiamen Tianma Micro-Electronics Co., Ltd., Xiamen (CN)

(72) Inventors: Xu Yang, Xiamen (CN); Bozhi Liu, Xiamen (CN); Guozhao Chen, Xiamen (CN)

(73) Assignee: XIAMEN TIANMA MICRO-ELECTRONICS CO., LTD., Xiamen (CN)

( * ) Notice: Subject to any disclaimer, the term of this patent is extended or adjusted under 35 U.S.C. 154(b) by 0 days.

(21) Appl. No.: 16/787,720

(22) Filed: Feb. 11, 2020

(30) Foreign Application Priority Data

Oct. 31, 2019 (CN) .......................... 201911054606.2

(51) Int. Cl.
*G02F 1/1362* (2006.01)
*G02F 1/1333* (2006.01)

(52) U.S. Cl.
CPC .... *G02F 1/136209* (2013.01); *G02F 1/13338* (2013.01); *G02F 1/133345* (2013.01); *G02F 2001/133357* (2013.01)

(58) Field of Classification Search
CPC ........... G02F 1/136209; G02F 1/13338; G02F 1/133345; G02F 2001/133357; G02F 1/133512
See application file for complete search history.

(56) References Cited

U.S. PATENT DOCUMENTS

2019/0296055 A1* 9/2019 Lius ...................... G02F 1/1362

FOREIGN PATENT DOCUMENTS

| CN | 106684202 A | 5/2017 |
| CN | 109521590 A | 3/2019 |

* cited by examiner

*Primary Examiner* — Jessica M Merlin
(74) *Attorney, Agent, or Firm* — Anova Law Group PLLC

(57) ABSTRACT

The present disclosure provides an array substrate, a display panel, and a display device. The array substrate includes a base substrate; a first light-shielding layer, disposed on a side of the base substrate; a light-sensitive structure, disposed on the side of the first light-shielding layer away from the base substrate; a second light-shielding layer, disposed on the side of the light-sensitive structure facing away from the base substrate; and a light-shielding structure, disposed between the first light-shielding layer and the second light-shielding layer. The orthogonal projection of the light-shielding structure surrounds the orthogonal projection of the light-sensitive structure. In the direction perpendicular to the base substrate, the light-shielding structure includes a first light-shielding section and a second light-shielding section. The first light-shielding section is disposed close to the first light-shielding layer, and the first light-shielding section and the second light-shielding section are formed by different fabrication processes.

20 Claims, 13 Drawing Sheets

ARRAY SUBSTRATE, DISPLAY PANEL, AND DISPLAY DEVICE

CROSS-REFERENCES TO RELATED APPLICATIONS

This application claims the priority of Chinese patent application No. 201911054606.2, filed on Oct. 31, 2019, the entirety of which is incorporated herein by reference.

FIELD OF THE DISCLOSURE

The present disclosure generally relates to the field of display technology and, more particularly, relates to an array substrate, a display panel, and a display device.

BACKGROUND

Currently, in-screen fingerprint recognition, by embedding a fingerprint recognition device into a display area, is a research hotspot in the field of display technology. Embedding the fingerprint recognition device in a display area rather than in a non-display area may be conducive to increasing the screen ratio of the display screen.

The existing fingerprint recognition technologies include optical fingerprint recognition technology, semiconductor-silicon fingerprint recognition technology, and ultrasonic fingerprint recognition technology. Among different technologies, the optical fingerprint recognition technology generally uses a photodiode as a light-sensitive structure, and the operation principle of the optical fingerprint recognition technology is: the incident light is reflected by a touch object, and the reflection light is then irradiated onto the photodiode, causing the photodiode to generate a photocurrent; and because the ridges and the valleys of the fingerprint have different reflectivity, and thus the intensity of the light reflected by the valley positions is different from the intensity of the light reflected by the ridge positions. Therefore, the photocurrent generated by the photodiode corresponding to the valley positions and the photocurrent generated by the photodiode corresponding to the ridge positions are different. As such, fingerprint recognition may be implemented.

Generally, an array substrate includes a plurality of light-sensitive structures, and each light-sensitive structure is configured to receive light reflected from a corresponding fingerprint recognition area directly disposed above it. When crosstalk light (i.e., interference light) reflected from an adjacent fingerprint recognition area is irradiated onto the light-sensitive structure, the magnitude of the photocurrent generated by the light-sensitive structure may be affected, and thus the accuracy of fingerprint recognition may be degraded.

The disclosed array substrate, display panel, and display device are directed to solve one or more problems set forth above and other problems in the art.

BRIEF SUMMARY OF THE DISCLOSURE

One aspect of the present disclosure provides an array substrate. The array substrate includes a base substrate; a first light-shielding layer, disposed on a side of the base substrate; a light-sensitive structure, disposed on the side of the first light-shielding layer away from the base substrate; a second light-shielding layer, disposed on the side of the light-sensitive structure away from the base substrate; and a light-shielding structure, disposed between the first light-shielding layer and the second light-shielding layer. The orthogonal projection of the light-shielding structure on the base substrate surrounds the orthogonal projection of the light-sensitive structure on the base substrate, and in the direction perpendicular to the base substrate, the light-shielding structure at least includes a first light-shielding section and a second light-shielding section. The first light-shielding section is disposed on a side close to the first light-shielding layer, and the first light-shielding section and the second light-shielding section are formed by different fabrication processes.

Another aspect of the present disclosure provides a display panel. The display panel includes an array substrate. The array substrate includes a base substrate; a first light-shielding layer, disposed on a side of the base substrate; a light-sensitive structure, disposed on the side of the first light-shielding layer away from the base substrate; a second light-shielding layer, disposed on the side of the light-sensitive structure away from the base substrate; and a light-shielding structure, disposed between the first light-shielding layer and the second light-shielding layer. The orthogonal projection of the light-shielding structure on the base substrate surrounds the orthogonal projection of the light-sensitive structure on the base substrate, and in the direction perpendicular to the base substrate, the light-shielding structure at least includes a first light-shielding section and a second light-shielding section. The first light-shielding section is disposed on a side close to the first light-shielding layer, and the first light-shielding section and the second light-shielding section are formed by different fabrication processes.

Another aspect of the present disclosure provides a display device. The display device includes a display panel, and the display panel includes an array substrate. The array substrate includes a base substrate; a first light-shielding layer, disposed on a side of the base substrate; a light-sensitive structure, disposed on the side of the first light-shielding layer away from the base substrate; a second light-shielding layer, disposed on the side of the light-sensitive structure away from the base substrate; and a light-shielding structure, disposed between the first light-shielding layer and the second light-shielding layer. The orthogonal projection of the light-shielding structure on the base substrate surrounds the orthogonal projection of the light-sensitive structure on the base substrate, and in the direction perpendicular to the base substrate, the light-shielding structure at least includes a first light-shielding section and a second light-shielding section. The first light-shielding section is disposed on a side close to the first light-shielding layer, and the first light-shielding section and the second light-shielding section are formed by different fabrication processes.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Various exemplary embodiments of the present disclosure will now be described in detail with reference to the accompanying drawings. It should be noted that the relative arrangement of the components and steps, numerical expressions and numerical values set forth in the embodiments are not intended to limit the scope of the present disclosure. The following description of the at least one exemplary embodiment is merely illustrative, and by no means can be considered as limitations for the application or use of the present disclosure.

It should be noted that techniques, methods, and apparatuses known to those of ordinary skill in the relevant art may not be discussed in detail, but where appropriate, the techniques, methods, and apparatuses should be considered as part of the specification.

It should be noted that similar reference numbers and letters indicate similar items in subsequent figures, and therefore, once an item is defined in a figure, it is not required to be further discussed or defined in the subsequent figures.

Figure 1:
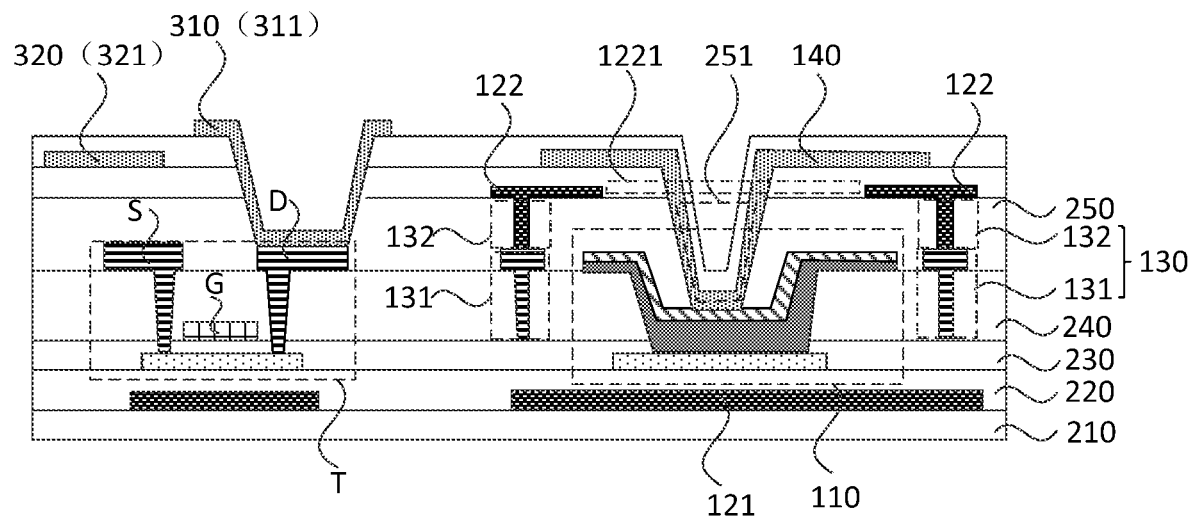
FIG. 1 illustrates a schematic structural diagram of an exemplary array substrate according to various embodiments of the present disclosure.

FIG. 1 illustrates a schematic structural diagram of an exemplary array substrate according to various embodiments of the present disclosure. Referring to FIG. 1, the array substrate may include a base substrate 210 and a first light-shielding layer 121, disposed on one side of the base substrate 210; a light-sensitive structure 110, disposed on the side of the first light-shielding layer 121 away from the base substrate 210; a second light-shielding layer 122, disposed on the side of the light-sensitive structure 110 away from the base substrate 210; a light-shielding structure 130, disposed between the first light-shielding layer 121 and the second light-shielding layer 122. Along a direction perpendicular to the base substrate 210, the light-shielding structure 130 may surround the light-sensitive structure 110. The light-shielding structure 130 may at least include a first light-shielding section 131 and a second light-shielding section 132. The first light-shielding section 131 may be disposed on the side close to the first light-shielding layer 121, and the first light-shielding section 131 and the second light-shielding section 132 may be formed by different fabrication processes.

In one embodiment, the material of the first light-shielding layer 121 and the second light-shielding layer 122 may be a light-shielding metal or a black insulating material. The material of the first light-shielding layer 121 and the second light-shielding layer 122 may be selected according to the actual applications, and is not limited herein. When the second light-shielding layer 122 is close to the touch object, the second light-shielding layer 122 may be mainly used to prevent crosstalk light from being irradiated onto the light-sensitive structure 110, and the first light-shielding layer 121 may be mainly used to prevent the light emitted by the backlight source in a backlight module from being directly irradiated onto the light-sensitive structure 110 or prevent the outside light from being directly irradiated onto the light-sensitive structure 110. When the first light-shielding layer 121 is close to the touch object, the first light-shielding layer 121 may be mainly used to prevent crosstalk light from being irradiated onto the light-sensitive structure 110, and the second light-shielding layer 122 may be mainly used to prevent the light emitted by the backlight source in the backlight module from being directly irradiated onto the light-sensitive structure 110 or prevent the outside light from being directly irradiated onto the light-sensitive structure 110.

In one embodiment, the light-sensitive structure 110 may be configured to convert the reflection light reflected back from a touch object into a photocurrent, and transmit the photocurrent to a fingerprint identification signal-receiving unit (shown in the figure) through a fingerprint identification signal line. When light is irradiated onto the valley and ridge lines of a fingerprint, the reflection angles from the valley and ridge lines and the intensity of the light reflected back from the valley and ridge lines may be different. Therefore, the fingerprint recognition signal-receiving unit may be able to identify the valley and ridge lines of the fingerprint. For example, along the direction perpendicular to the plane of the base substrate 210, the light-sensitive structure 110 may include an N-type semiconductor layer, an intrinsic semiconductor layer, and a P-type semiconductor layer that are sequentially stacked on each other.

In one embodiment, the material of the first light-shielding section 131 may be a metal or a black insulation material, and the material of the second light-shielding section 132 may be a metal or a black insulation material. The material of the first light-shielding section 131 and the material of the second light-shielding section 132 may be the same or may be different, which is not limited herein. The shape of the orthogonal projection of the first light-shielding section 131 on the base substrate 210 may be circular, oval, rectangular, etc., and the shape of the orthogonal projection of the second light-shielding section 132 on the base substrate 210 may be circular, rectangle, etc. The shape of the orthogonal projection of the first light-shielding section 131 on the base substrate 210 and the shape of the orthogonal projection of the second light-shielding section 132 on the base substrate 210 may be the same or may be different, which is not limited herein.

It should be understood that the greater the degree to which the light-shielding structure 130 surrounds the light-sensitive structure 110, the stronger the ability of the light-shielding structure 130 to prevent the interference of crosstalk light. In one embodiment, the degree to which the light-shielding structure 130 surrounds the light-sensitive structure 110 may be defined as follows. For a proposed plane that is perpendicular to the base substrate 210, an area of the orthogonal projection of the light-sensitive structure 110 on the proposed plane is S1, and an area overlapped between the orthogonal projection of the light-sensitive structure 110 on the proposed plane and the orthogonal projection of the light-shielding structure 130 on the proposed plane is S2. The ratio between the two areas, i.e., $$\frac{S2}{S1}$$

may be used to represent me degree to which the light-shielding structure 130 surrounds the light-sensitive structure 110. The greater the value of $$\frac{S2}{S1}$$

is, me higher degree to which the light-shielding structure 130 surrounds the light-sensitive structure 110.

It should be understood that the light-shielding structure 130 is divided into at least two light-shielding sections, so that the height of each light-shielding section is relatively small along the direction perpendicular to the base substrate 210. As such, the depth of the perforation formed in the display panel during the fabrication process of the light-shielding sections may be reduced. Correspondingly, the filling depth of the material used to fabricate the light-shielding sections may be reduced, so that the material used to fabricate the light-shielding sections may easily fill the via holes in a continuous manner without breaking, thereby conducive to reducing the difficulty of the fabrication process of the light-shielding sections and improving the production yield of the light-shielding section. In one embodiment, the height of each light-shielding section may be determined by those skilled in the art according to the actual process, which is not limited herein. In some other embodiments, the number of light-shielding sections included in the light-shielding structure 130 may also be determined according to actual conditions, which is not limited herein. As an example for illustration, in the array substrate shown in FIG. 1, the light-shielding structure 130 is described to include a first light-shielding section 131 and a second light-shielding section 132.

In one embodiment, among the light-shielding sections included in the light-shielding structure 130, at least one light-shielding section may be provided on a same layer and use a same material as the existing film layer in the array substrate. As such, the fabrication process of the array substrate may be simplified and the fabrication efficiency may be improved, thereby conducive to the thinning of the array substrate. In other embodiments, a new film layer may be added to the array substrate to dispose the light-shielding section. As such, the material of each light-shielding section may be flexibly selected, and the film layer in the array substrate penetrated by the light-shielding section may also be flexibly determined.

In the array substrate according to various embodiments of the present disclosure, by disposing the light-shielding structure 130 to surround the light-sensitive structure 110, the light-shielding structure 130 may be able to block the crosstalk light that is incident on the light-sensitive structure 110 from the side of the light-sensitive structure 110, thereby preventing the crosstalk light from being irradiated onto the light-sensitive structure 110, preventing the light-sensitive structure 110 from being interfered, solving the problem that the light-sensitive structure 110 is interfered by crosstalk light, and improving the accuracy of fingerprint recognition. In the meantime, by setting the light-shielding structure 130 to include at least a first light-shielding section 131 and a second light-shielding section 132, and forming the first light-shielding section 131 and the second light-shielding section 132 using different fabrication processes, the difficulty of the fabrication process of the light-shielding structure 130 may be reduced, the process of preparing the light-shielding structure 130 may be simplified, thereby conducive to improving the production yield of the array substrate.

Referring to FIG. 1, on the basis of the above technical schemes, in one embodiment, the array substrate may further include: a gate electrode layer and a source-drain electrode layer. The gate electrode layer may be disposed between the base substrate 210 and the source-drain electrode layer, and the source-drain electrode layer may be disposed on the side of the second light-shielding layer 122 that is adjacent to the base substrate 210. The array substrate may further include a plurality of driving circuits. Each driving circuit of the plurality of driving circuits may include a thin film transistor T. The thin film transistor T may include a gate G, a source S, and a drain D, and the gate G may be disposed in the gate electrode layer, the source S and the drain D may be disposed in the source-drain electrode layer. The first light-shielding section 131 and the gate electrode layer or the source-drain electrode layer may be formed using a same fabrication process.

It should be noted that using a same fabrication process refers to disposing in a same layer, using a same material, and adopting a same fabrication procedure. The advantage of the above arrangement is that, by using a same fabrication process for forming the first light-shielding section 131 and the gate electrode layer, or using a same fabrication process for forming the first light-shielding section 131 and the source-drain electrode layer, the fabrication process of the first light-shielding section 131 may be matched with the existing fabrication process of the array substrate to ensure that the fabrication process of the first light-shielding section 131 is simple.

The thin film transistor T provided in various embodiments of the present disclosure may include a thin film transistor T of a top-gate structure and a thin-film transistor T of a bottom-gate structure. The light-shielding structure 130 may include two light-shielding sections, three light-shielding sections, or even more light-shielding sections. Various exemplary structures of the array substrate will be described in the following according to the structure type of the thin film transistor and the number of light-shielding sections included in the light-shielding structure.

In some embodiments, the thin film transistor T may be a top-gate structure, and the light-shielding structure 130 may include a first light-shielding section 131 and a second light-shielding section 132. The detailed structure of the array substrate is described below.

Figure 2:
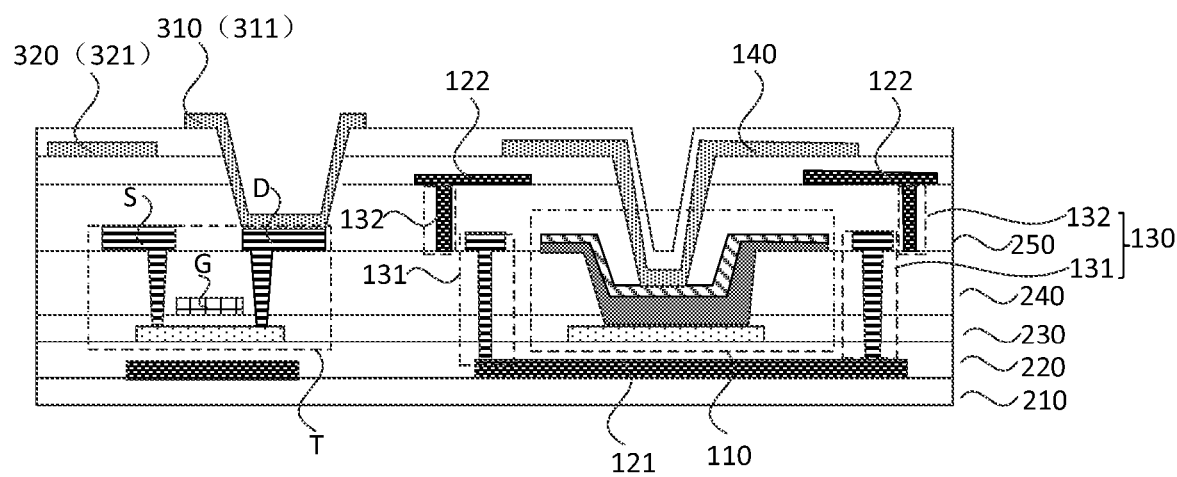
FIG. 2 illustrates a schematic structural diagram of another exemplary array substrate according to various embodiments of the present disclosure.
Figure 3:
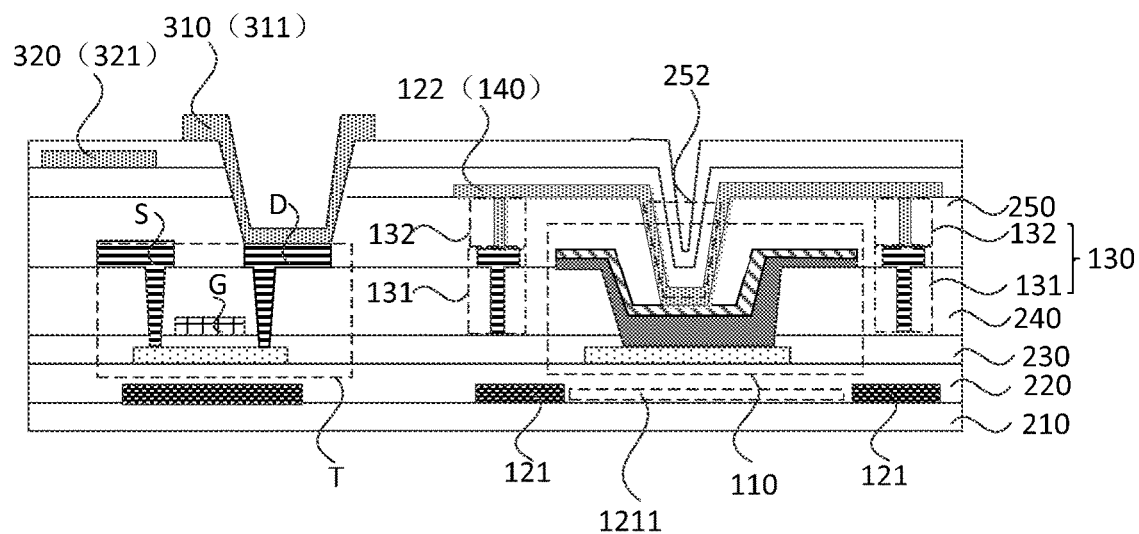
FIG. 3 illustrates a schematic structural diagram of another exemplary array substrate according to various embodiments of the present disclosure.
Figure 4:
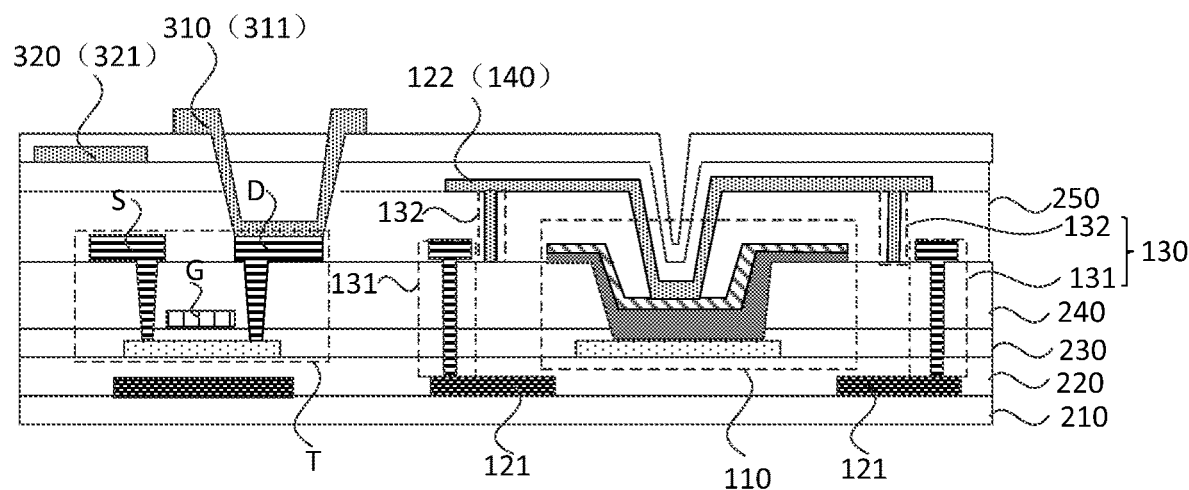
FIG. 4 illustrates a schematic structural diagram of another exemplary array substrate according to various embodiments of the present disclosure.

FIG. 2 illustrates a schematic structural diagram of another exemplary array substrate according to various embodiments of the present disclosure, FIG. 3 illustrates a schematic structural diagram of another exemplary array substrate according to various embodiments of the present disclosure, and FIG. 4 illustrates a schematic structural diagram of another exemplary array substrate according to various embodiments of the present disclosure. Referring to FIGS. 1-4, in some embodiments, the array substrate may further include a buffer layer 220, a gate insulating layer 230, an interlayer dielectric layer 240, and a planarization layer 250.

The buffer layer 220 may be disposed on the side of the first light-shielding layer 121 away from the base substrate 210; the planarization layer 250 may be disposed on the side of the source-drain electrode layer that faces toward the second light-shielding layer 122; the interlayer dielectric layer 240 may be disposed between the planarization layer 250 and the gate insulating layer 230; and the gate insulating layer 230 may be disposed on the side of the gate electrode layer that faces toward the first light-shielding layer 121. In one embodiment, the second light-shielding section 132 may penetrate the planarization layer 250, and may be formed using a same fabrication process as the second light-shielding layer 122; the first light-shielding section 131 may penetrate at least the interlayer dielectric layer 240, and may be formed using a same fabrication process as the source-drain electrode layer.

In one embodiment, when the disclosed array substrate is applied to a display panel, the first light-shielding layer 121 may be disposed on the side away from the touch object, or on the side close to the touch object. Taking a liquid crystal display panel as an example, as shown in FIG. 1 and FIG. 2, when the first light-shielding layer 121 is disposed on the side away from the touch object, the array substrate may be disposed between the color filter substrate and the backlight module. The side of the color film substrate away from the array substrate may be the light-emitting side of the liquid crystal display panel, and the light emitted by the backlight source in the backlight module may sequentially penetrate through the array substrate and the color film substrate to be irradiated onto the touch object. When, as shown in FIG. 3 and FIG. 4, the first light-shielding layer 121 is disposed on the side close to the touch object, the color film substrate may be disposed between the array substrate and the backlight module. The side of the base substrate away from the light-shielding layer 121 may be the light-emitting side of the liquid crystal display panel. The light emitted by the backlight source in the backlight module may sequentially penetrate through the color film substrate and the array substrate to be irradiated onto the touch object.

In one embodiment, the first light-shielding section 131 may penetrate through the interlayer dielectric layer 240 as shown in FIG. 1 and FIG. 3. In some other embodiments, the first light-shielding section 131 may penetrate through the interlayer dielectric layer 240 and the gate insulating layer 230, or alternatively, the first light-shielding section 131 may penetrate through the interlayer dielectric layer 240, the gate insulating layer 230, and the buffer layer 220 as shown in FIG. 2 and FIG. 4. It should be understood that among the three scenarios described above, when the first light-shielding section 131 penetrates the interlayer dielectric layer 240, the gate insulating layer 230, and the buffer layer 220, the degree to which that the light-shielding structure 130 surrounds the light-sensitive structure 110 may be larger, such that the light-shielding structure 130 may be able to block more crosstalk light from being irradiated onto the light-sensitive structure 110 from the side, thereby conducive to improving the accuracy of fingerprint recognition.

It should be noted that, by using a same fabrication process for forming the first light-shielding section 131 and the source-drain electrode layer, and using a same fabrication process for forming the second light-shielding section 132 and the second light-shielding layer 122, it may be ensured that the fabrication process of the first light-shielding section 131 and the second light-shielding section 132 is compatible with the existing fabrication process of the array substrate, and it may also be ensured that the fabrication process of the first light-shielding section 131 and the second light-shielding section 132 is simple.

Figure 5:
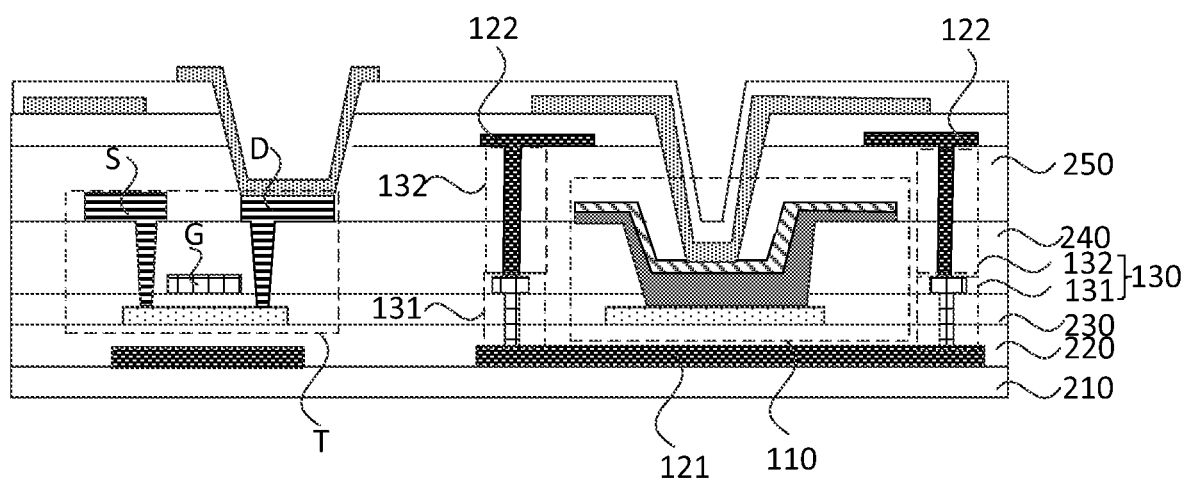
FIG. 5 illustrates a schematic structural diagram of an exemplary array substrate according to various embodiments of the present disclosure.
Figure 6:
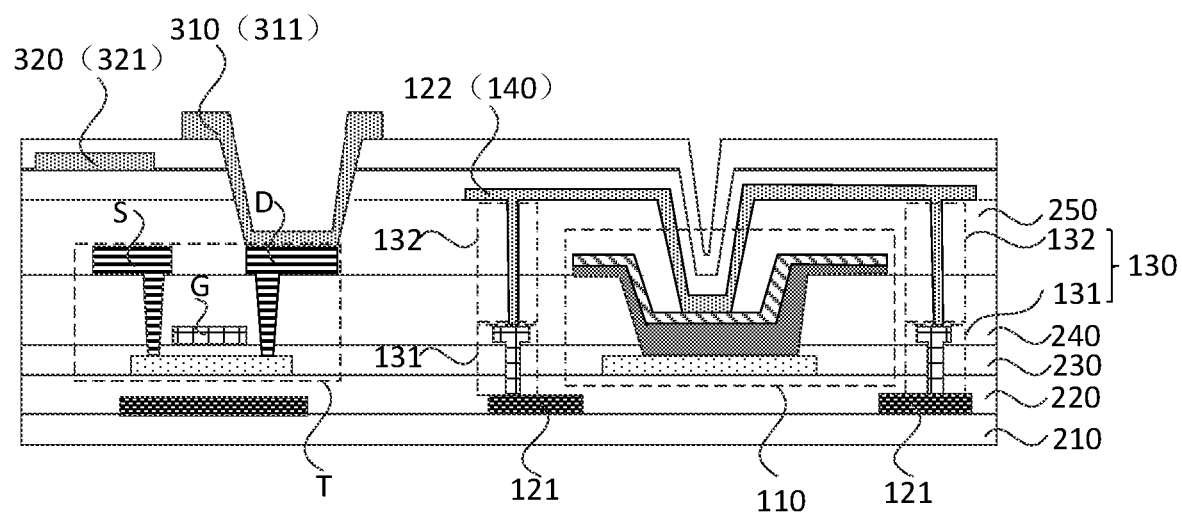
FIG. 6 illustrates a schematic structural diagram of another exemplary array substrate according to various embodiments of the present disclosure.

FIG. 5 illustrates a schematic structural diagram of an exemplary array substrate according to various embodiments of the present disclosure, and FIG. 6 illustrates a schematic structural diagram of another exemplary array substrate according to various embodiments of the present disclosure. In the structure of the array substrate shown in FIG. 5, the first light-shielding layer is disposed on the side away from the touch object, and in the structure of the array substrate shown in FIG. 6, the first light-shielding layer is disposed on the side close to the touch object. Referring to FIGS. 5-6, in some embodiments, the array substrate may further include a buffer layer 220, a gate insulating layer 230, an interlayer dielectric layer 240, and a planarization layer 250.

The buffer layer 220 may be disposed on the side of the first light-shielding layer 121 away from the base substrate 210; the planarization layer 250 may be disposed on the side of the source-drain electrode layer that faces toward the second light-shielding layer 122; the interlayer dielectric layer 240 may be disposed between the planarization layer 250 and the gate insulating layer 230; and the gate insulating layer 230 may be disposed on the side of the gate electrode layer that faces toward the first light-shielding layer 121. In one embodiment, the second light-shielding section 132 may penetrate the planarization layer 250 and the interlayer dielectric layer 240, and may be formed using a same fabrication process as the second light-shielding layer 122; the first light-shielding section 131 may penetrate at least the gate insulating layer 230, and may be formed using a same fabrication process as the gate electrode layer.

In one embodiment, the first light-shielding section 131 may penetrate the gate insulating layer 230, or the first light-shielding section 131 may penetrate the gate insulating layer 230 and the buffer layer as shown in FIG. 5 and FIG. 6. It should be understood that, between the two scenarios described above, when the first light-shielding section 131 penetrates the gate insulating layer 230 and the buffer layer 220, the degree to which that the light-shielding structure 130 surrounds the light-sensitive structure 110 may be larger, such that the light-shielding structure 130 may be able to block more crosstalk light from being irradiated onto the light-sensitive structure 110 from the side, thereby conducive to improving the accuracy of fingerprint recognition.

It should be noted that, by using a same fabrication process for forming the first light-shielding section 131 and the gate electrode layer, and using a same fabrication process for forming the second light-shielding section 132 and the second light-shielding layer 122, it may be ensured that the fabrication process of the first light-shielding section 131 and the second light-shielding section 132 is compatible with the existing fabrication process of the array substrate, and it may also be ensured that the fabrication process of the first light-shielding section 131 and the second light-shielding section 132 is simple.

Figure 7:
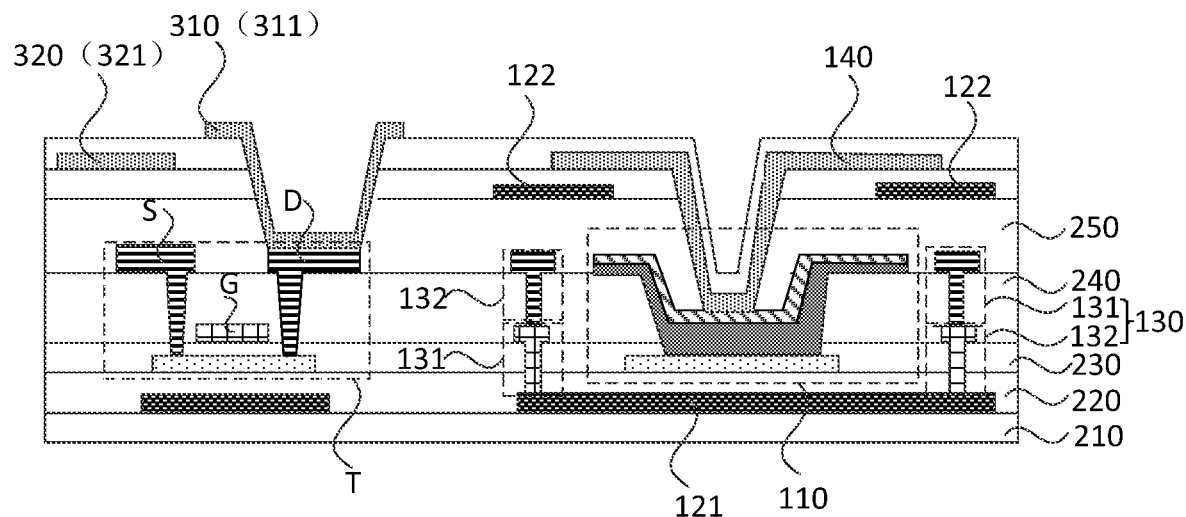
FIG. 7 illustrates a schematic structural diagram of another exemplary array substrate according to various embodiments of the present disclosure.
Figure 8:
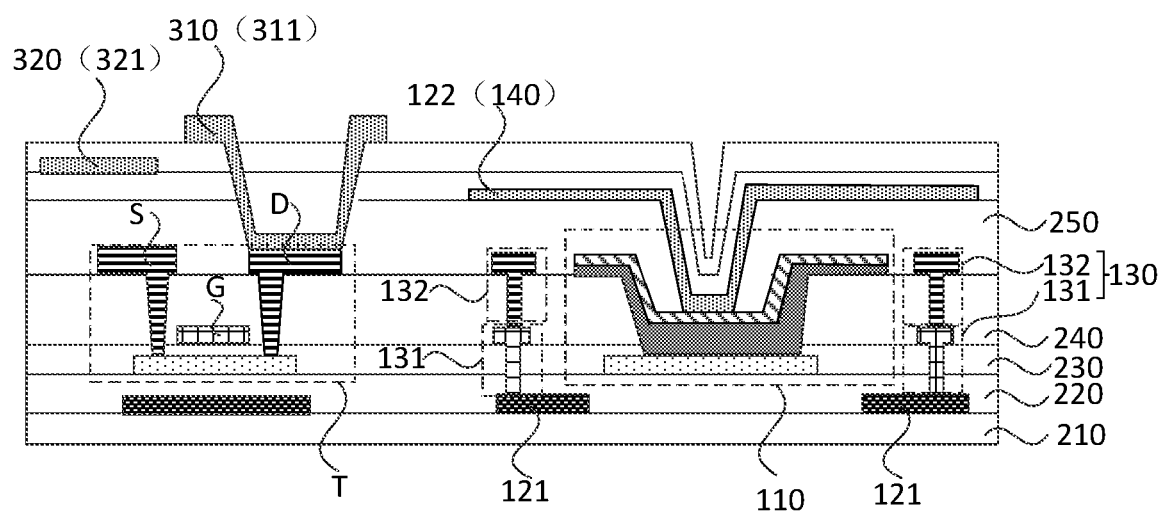
FIG. 8 illustrates a schematic structural diagram of another exemplary array substrate according to various embodiments of the present disclosure.

FIG. 7 illustrates a schematic structural diagram of an exemplary array substrate according to various embodiments of the present disclosure, and FIG. 8 illustrates a schematic structural diagram of another exemplary array substrate according to various embodiments of the present disclosure. In the structure of the array substrate shown in FIG. 7, the first light-shielding layer is disposed on the side away from the touch object, and in the structure of the array substrate shown in FIG. 8, the first light-shielding layer is disposed on the side close to the touch object. Referring to FIGS. 7-8, in some embodiments, the array substrate may further include a buffer layer 220, a gate insulating layer 230, an interlayer dielectric layer 240, and a planarization layer 250.

The buffer layer 220 may be disposed on the side of the first light-shielding layer 121 away from the base substrate 210; the planarization layer 250 may be disposed on the side of the source-drain electrode layer that faces toward the second light-shielding layer 122; the interlayer dielectric layer 240 may be disposed between the planarization layer 250 and the gate insulating layer 230; and the gate insulating layer 230 may be disposed on the side of the gate electrode layer that faces toward the first light-shielding layer 121. In one embodiment, the second light-shielding section 132 may penetrate the interlayer dielectric layer 240, and may be formed using a same fabrication process as the source-drain electrode layer; the first light-shielding section 131 may penetrate at least the gate insulating layer 230, and may be formed using a same fabrication process as the gate electrode layer.

In one embodiment, the first light-shielding section 131 may penetrate the gate insulating layer 230, or the first light-shielding section 131 may penetrate the gate insulating layer 230 and the buffer layer as shown in FIG. 7 and FIG. 8. It should be understood that, between the two scenarios described above, when the first light-shielding section 131 penetrates the gate insulating layer 230 and the buffer layer 220, the degree to which that the light-shielding structure 130 surrounds the light-sensitive structure 110 may be larger, such that the light-shielding structure 130 may be able to block more crosstalk light from being irradiated onto the light-sensitive structure 110 from the side, thereby conducive to improving the accuracy of fingerprint recognition.

It should be noted that, by using a same fabrication process for forming the first light-shielding section 131 and the gate electrode layer, and using a same fabrication process for forming the second light-shielding section 132 and the source-drain electrode layer, it may be ensured that the fabrication process of the first light-shielding section 131 and the second light-shielding section 132 is compatible with the existing fabrication process of the array substrate, and it may also be ensured that the fabrication process of the first light-shielding section 131 and the second light-shielding section 132 is simple.

In some embodiments, the thin film transistor T may be a bottom-gate structure, and the light-shielding structure 130 may include a first light-shielding section 131 and a second light-shielding section 132. The detailed structure of the array substrate is described below.

Figure 9:
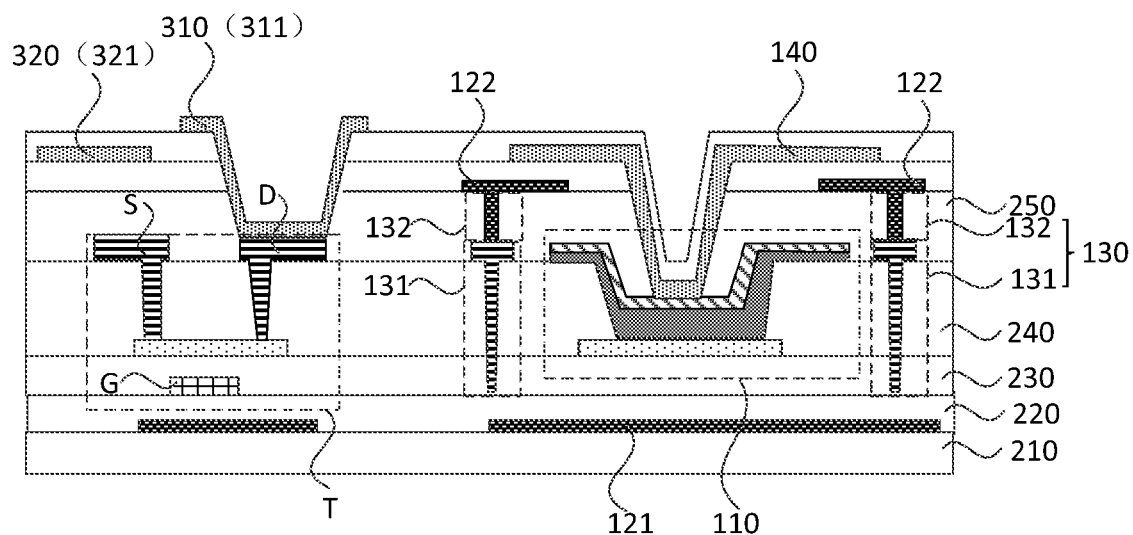
FIG. 9 illustrates a schematic structural diagram of an exemplary array substrate according to various embodiments of the present disclosure.
Figure 10:
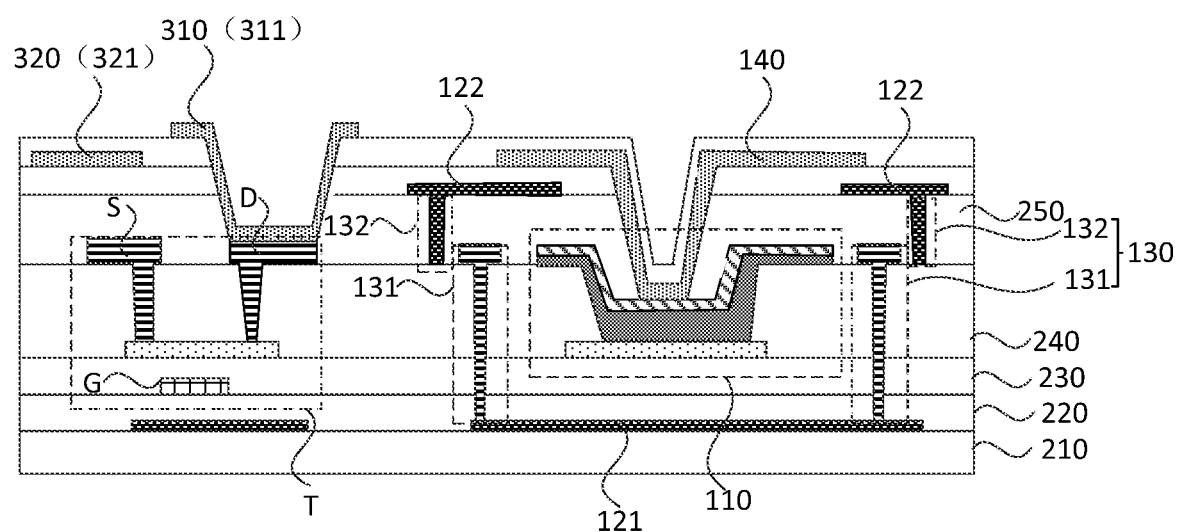
FIG. 10 illustrates a schematic structural diagram of another exemplary array substrate according to various embodiments of the present disclosure.
Figure 11:
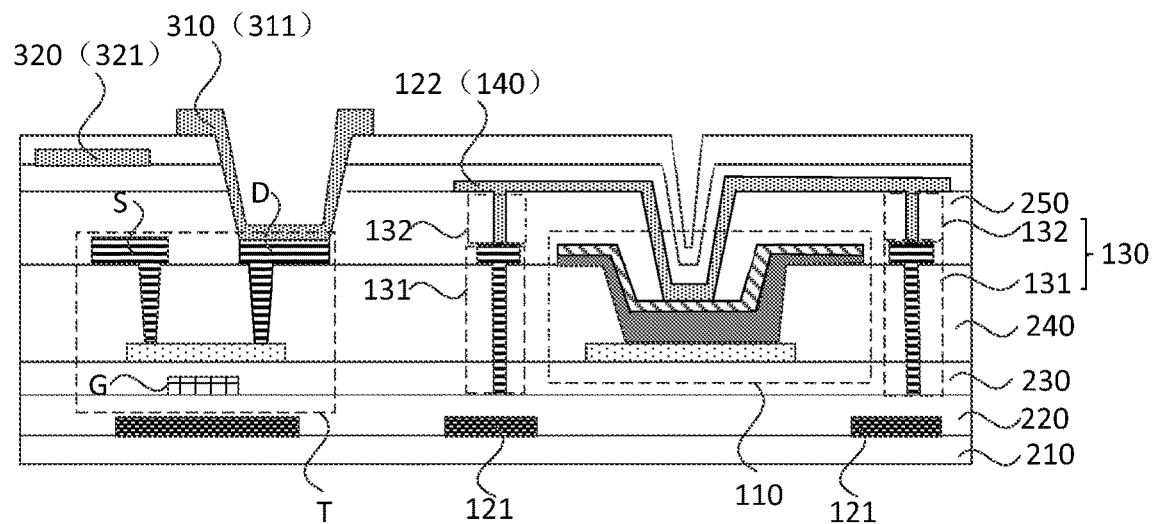
FIG. 11 illustrates a schematic structural diagram of another exemplary array substrate according to various embodiments of the present disclosure.
Figure 12:
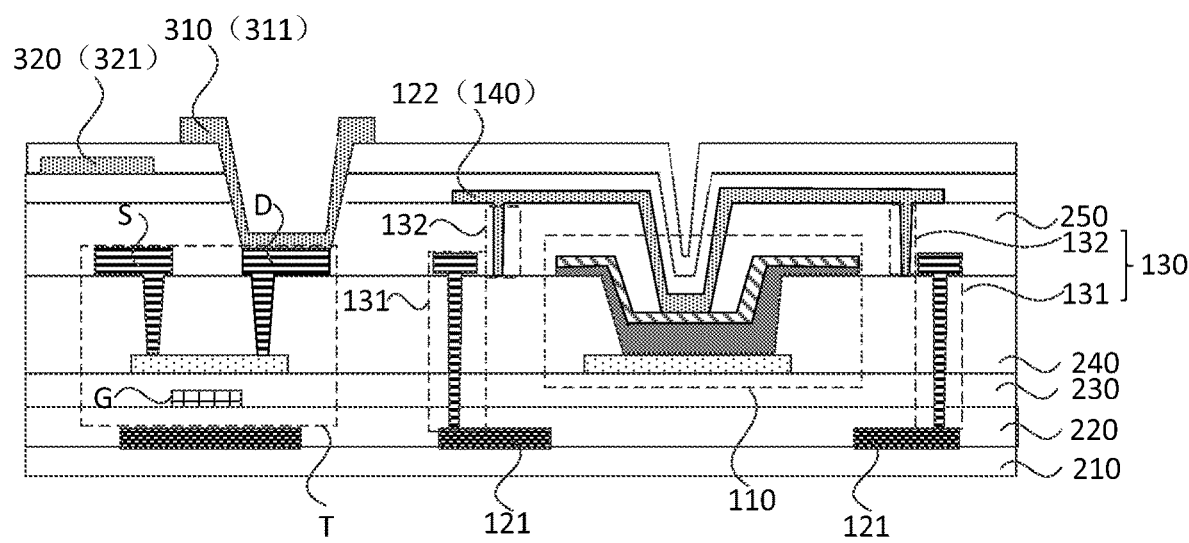
FIG. 12 illustrates a schematic structural diagram of another exemplary array substrate according to various embodiments of the present disclosure.

FIG. 9 illustrates a schematic structural diagram of an exemplary array substrate according to various embodiments of the present disclosure, FIG. 10 illustrates a schematic structural diagram of another exemplary array substrate according to various embodiments of the present disclosure, FIG. 11 illustrates a schematic structural diagram of another exemplary array substrate according to various embodiments of the present disclosure, and FIG. 12 illustrates a schematic structural diagram of another exemplary array substrate according to various embodiments of the present disclosure. In the structure of the array substrate shown in FIG. 9 and FIG. 10, the first light-shielding layer is disposed on the side away from the touch object, and in the structure of the array substrate shown in FIG. 11 and FIG. 12, the first light-shielding layer is disposed on the side close to the touch object. Referring to FIGS. 9-12, in some embodiments, the array substrate may further include a buffer layer 220, a gate insulating layer 230, an interlayer dielectric layer 240, and a planarization layer 250.

The buffer layer 220 may be disposed on the side of the first light-shielding layer 121 away from the base substrate 210; the planarization layer 250 may be disposed on the side of the source-drain electrode layer that faces toward the second light-shielding layer 122; the interlayer dielectric layer 240 may be disposed between the planarization layer 250 and the gate insulating layer 230; and the gate insulating layer 230 may be disposed on the side of the gate electrode layer that faces toward the second light-shielding layer 122. In one embodiment, the second light-shielding section 132 may penetrate the planarization layer 250, and may be formed using a same fabrication process as the second light-shielding layer 122; the first light-shielding section 131 may penetrate the interlayer dielectric layer 240, and may be formed using a same fabrication process as the source-drain electrode layer.

In one embodiment, the first light-shielding section 131 may penetrate through the interlayer dielectric layer 240. In some other embodiments, the first light-shielding section 131 may penetrate through the interlayer dielectric layer 240 and the gate insulating layer 230 as shown in FIG. 9 and FIG. 11, or alternatively, the first light-shielding section 131 may penetrate through the interlayer dielectric layer 240, the gate insulating layer 230, and the buffer layer 220 as shown in FIG. 10 and FIG. 12. It should be understood that among the three scenarios described above, when the first light-shielding section 131 penetrates the interlayer dielectric layer 240, the gate insulating layer 230, and the buffer layer 220, the degree to which that the light-shielding structure 130 surrounds the light-sensitive structure 110 may be larger, such that the light-shielding structure 130 may be able to block more crosstalk light from being irradiated onto the light-sensitive structure 110 from the side, thereby conducive to improving the accuracy of fingerprint recognition.

It should be noted that, by using a same fabrication process for forming the first light-shielding section 131 and the source-drain electrode layer, and using a same fabrication process for forming the second light-shielding section 132 and the second light-shielding layer 122, it may be ensured that the fabrication process of the first light-shielding section 131 and the second light-shielding section 132 is compatible with the existing fabrication process of the array substrate, and it may also be ensured that the fabrication process of the first light-shielding section 131 and the second light-shielding section 132 is simple.

Figure 13:
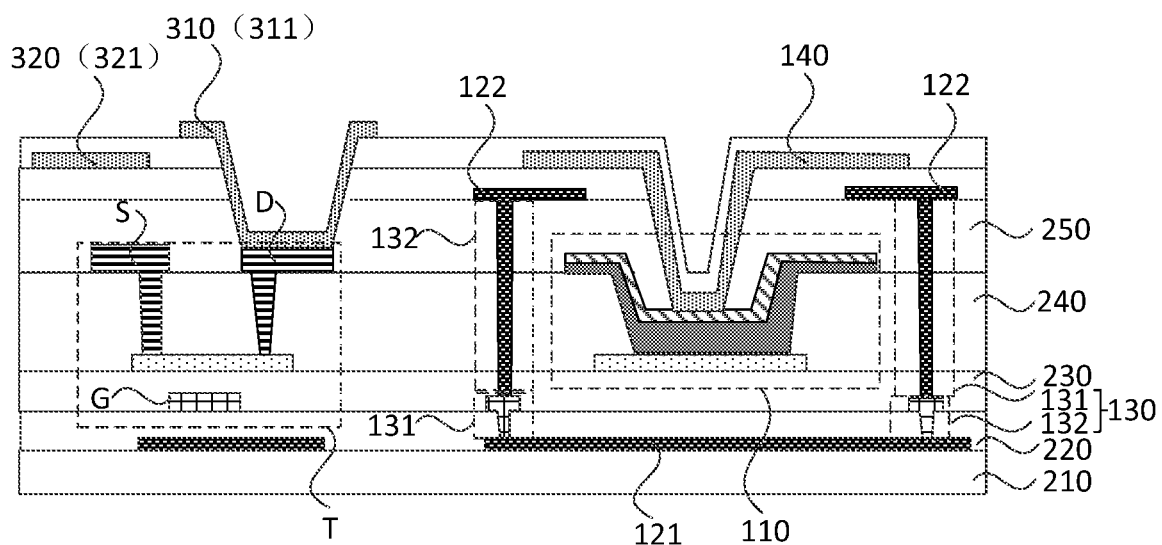
FIG. 13 illustrates a schematic structural diagram of an exemplary array substrate according to various embodiments of the present disclosure.
Figure 14:
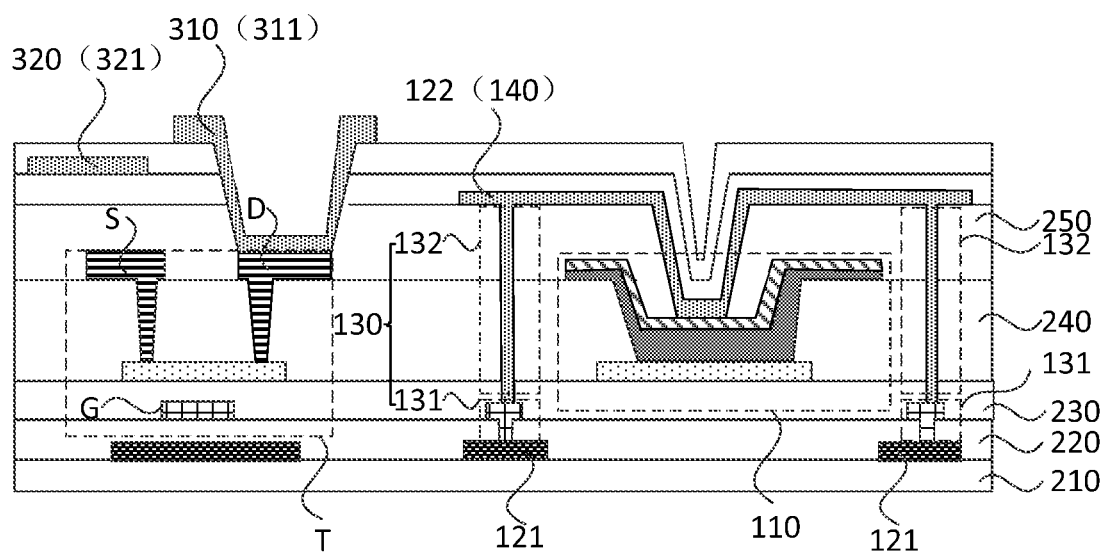
FIG. 14 illustrates a schematic structural diagram of another exemplary array substrate according to various embodiments of the present disclosure.

FIG. 13 illustrates a schematic structural diagram of an exemplary array substrate according to various embodiments of the present disclosure, and FIG. 14 illustrates a schematic structural diagram of another exemplary array substrate according to various embodiments of the present disclosure. In the structure of the array substrate shown in FIG. 13, the first light-shielding layer is disposed on the side away from the touch object, and in the structure of the array substrate shown in FIG. 14, the first light-shielding layer is disposed on the side close to the touch object. Referring to FIGS. 13-14, in some embodiments, the array substrate may further include a buffer layer 220, a gate insulating layer 230, an interlayer dielectric layer 240, and a planarization layer 250.

The buffer layer 220 may be disposed on the side of the first light-shielding layer 121 away from the base substrate 210; the planarization layer 250 may be disposed on the side of the source-drain electrode layer that faces toward the second light-shielding layer 122; the interlayer dielectric layer 240 may be disposed between the planarization layer 250 and the gate insulating layer 230; the gate insulating layer 230 may be disposed on the side of the gate electrode layer that faces toward the second light-shielding layer 122. In one embodiment, the second light-shielding section 132 may penetrate the planarization layer 250, the interlayer dielectric layer 240, and the gate insulating layer 230, and may be formed using a same fabrication process as the second light-shielding layer 122; the first light-shielding section 131 may penetrate the buffer layer 220, and may be formed using a same fabrication process as the gate electrode layer.

It should be noted that, by using a same fabrication process for forming the first light-shielding section 131 and the gate electrode layer, and using a same fabrication process for forming the second light-shielding section 132 and the second light-shielding layer 122, it may be ensured that the fabrication process of the first light-shielding section 131 and the second light-shielding section 132 is compatible with the existing fabrication process of the array substrate. As such, the light-shielding structure 130 may be able to block more crosstalk light from being irradiated onto the light-sensitive structure 110 from the side, thereby conducive to improving the accuracy of fingerprint recognition.

Figure 15:
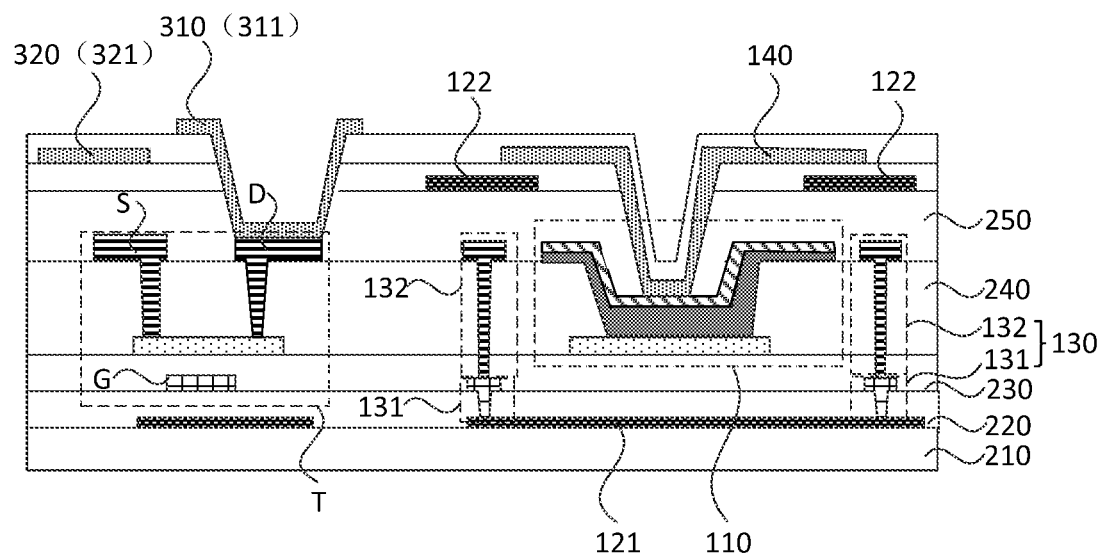
FIG. 15 illustrates a schematic structural diagram of another exemplary array substrate according to various embodiments of the present disclosure.
Figure 16:
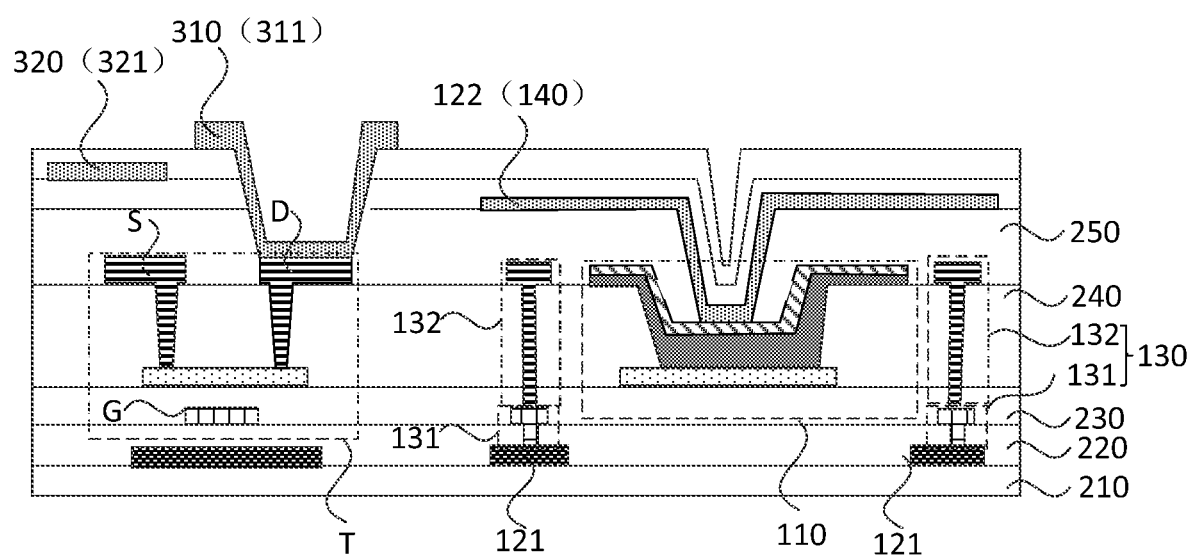
FIG. 16 illustrates a schematic structural diagram of another exemplary array substrate according to various embodiments of the present disclosure.

FIG. 15 illustrates a schematic structural diagram of an exemplary array substrate according to various embodiments of the present disclosure, and FIG. 16 illustrates a schematic structural diagram of another exemplary array substrate according to various embodiments of the present disclosure. In the structure of the array substrate shown in FIG. 15, the first light-shielding layer is disposed on the side away from the touch object, and in the structure of the array substrate shown in FIG. 16, the first light-shielding layer is disposed on the side close to the touch object. Referring to FIGS. 15-16, in some embodiments, the array substrate may further include a buffer layer 220, a gate insulating layer 230, an interlayer dielectric layer 240, and a planarization layer 250.

The buffer layer 220 may be disposed on the side of the first light-shielding layer 121 away from the base substrate 210; the planarization layer 250 may be disposed on the side of the source-drain electrode layer that faces toward the second light-shielding layer 122; the interlayer dielectric layer 240 may be disposed between the planarization layer 250 and the gate insulating layer 230; and the gate insulating layer 230 may be disposed on the side of the gate electrode layer that faces toward the second light-shielding layer 122. In one embodiment, the second light-shielding section 132 may penetrate the interlayer dielectric layer 240 and the gate insulating layer 230, and may be formed using a same fabrication process as the source-drain electrode layer; the first light-shielding section 131 may penetrate the buffer layer 220, and may be formed using a same fabrication process as the gate electrode layer.

It should be noted that, by using a same fabrication process for forming the first light-shielding section 131 and the gate electrode layer, and using a same fabrication process for forming the second light-shielding section 132 and the source-drain electrode layer, it may be ensured that the fabrication process of the first light-shielding section 131 and the second light-shielding section 132 is compatible with the existing fabrication process of the array substrate, and it may also be ensured that the fabrication process of the first light-shielding section 131 and the second light-shielding section 132 is simple.

Figure 17:
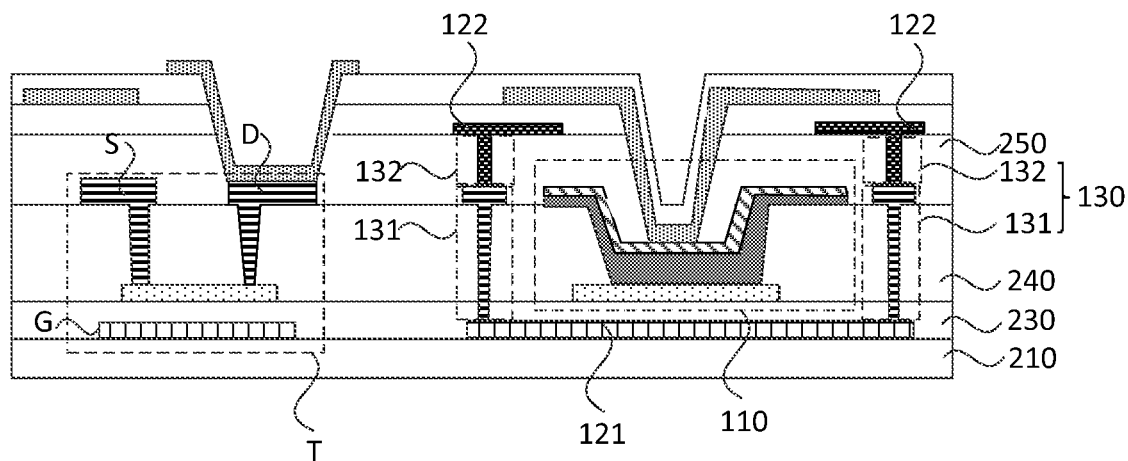
FIG. 17 illustrates a schematic structural diagram of an exemplary array substrate according to various embodiments of the present disclosure.
Figure 18:
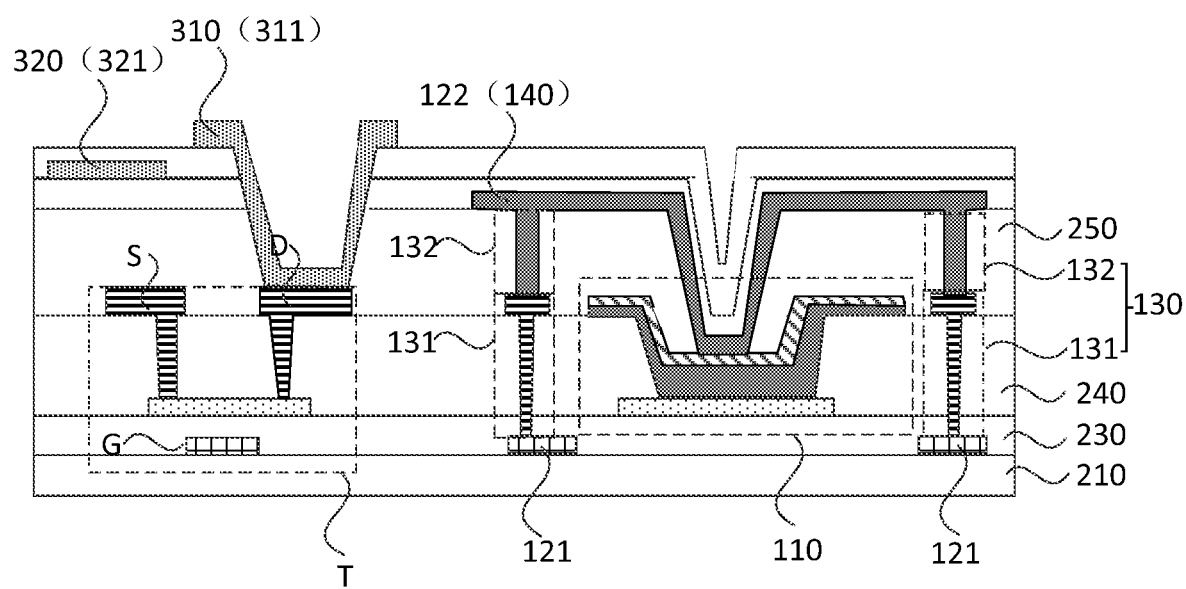
FIG. 18 illustrates a schematic structural diagram of another exemplary array substrate according to various embodiments of the present disclosure.

FIG. 17 illustrates a schematic structural diagram of an exemplary array substrate according to various embodiments of the present disclosure, and FIG. 18 illustrates a schematic structural diagram of another exemplary array substrate according to various embodiments of the present disclosure. In the structure of the array substrate shown in FIG. 17, the first light-shielding layer is disposed on the side away from the touch object, and in the structure of the array substrate shown in FIG. 18, the first light-shielding layer is disposed on the side close to the touch object. Referring to FIGS. 17-18, in some embodiments, the array substrate may further include a gate insulating layer 230, an interlayer dielectric layer 240, and a planarization layer 250.

The planarization layer 250 may be disposed on the side of the source-drain electrode layer that faces toward the second light-shielding layer 122; the interlayer dielectric layer 240 may be disposed between the planarization layer 250 and the gate insulating layer 230; and the gate insulating layer 230 may be disposed on the side of the gate electrode layer away from the base substrate 210. The second light-shielding section 132 may penetrate the planarization layer 250, and may be formed using a same fabrication process as the second light-shielding layer 122; the first light-shielding section 131 may at least penetrate the interlayer dielectric layer 240, and may be formed using a same fabrication process as the source-drain electrode layer. The portion of the gate electrode layer that is directly opposite to the light-sensitive structure 110 may be multiplexed as the first light-shielding layer 131.

For example, when the material of the gate G is a light-shielding metal, the gate G may not only serve as a part of the thin-film transistor, but also play a light-shielding role, thereby preventing external light from being irradiated onto the channel in the thin-film transistor T. In the meantime, the portion of the gate electrode layer that is directly opposite to the light-sensitive structure 110 may be multiplexed as the first light-shielding layer 121, so that compared with the array substrates shown in FIGS. 1-16, the array substrates shown in FIGS. 17-18 may not need to separately dispose a first light-shielding layer 121, thereby conducive to reducing the thickness of the array substrate.

In one embodiment, the first light-shielding section 131 may penetrate the interlayer dielectric layer 240. Alternatively, as shown in FIGS. 17 and 18, the first light-shielding section 131 may penetrate the interlayer dielectric layer 240 and the gate insulating layer 230. It should be understood that, in the two scenarios described above, when the first light-shielding section 131 penetrates the interlayer dielectric layer 240 and the gate insulating layer 230, the light-shielding structure 130 may substantially surround the light-sensitive structure 110, such that the light-shielding structure 130 may be able to block more crosstalk light from being irradiated onto the light-sensitive structure 110 from the side, thereby conducive to improving the accuracy of fingerprint recognition.

It should be noted that, by using a same fabrication process for forming the first light-shielding section 131 and the source-drain electrode layer, and using a same fabrication process for forming the second light-shielding section 132 and the second light-shielding layer 122, it may be ensured that the fabrication process of the first light-shielding section 131 and the second light-shielding section 132 is compatible with the existing fabrication process of the array substrate, and it may also be ensured that the fabrication process of the first light-shielding section 131 and the second light-shielding section 132 is simple.

Referring to FIGS. 1-19, on the basis of the above technical schemes, in one embodiment, the light-shielding structure 130 may include a first light-shielding section 131 and a second light-shielding section 132 that are disposed adjacent to each other. In the direction perpendicular to the base substrate 210, the distance between the surface of the first light-shielding section 131 that is close to the first light-shielding layer 121 and the surface of the first light-shielding layer 121 away from the base substrate 210 may be smaller than the distance between the position of the light-sensitive structure 110 that is closest to the surface of the first light-shielding layer 121 and the surface of the first light-shielding layer 121 away from the base substrate 210, and/or the distance between the surface of the second light-shielding section 132 that is close to the second light-shielding layer 122 and the surface of the second light-shielding layer 122 that faces toward the base substrate 210 may be smaller than the distance between the position of the light-sensitive structure 110 that is closest to the surface of the second light-shielding layer 122 and the surface of the second light-shielding layer 122 that faces toward the base substrate 210.

In one embodiment, each point on the surface of the light-sensitive structure 110 that is close to the first light-shielding layer 121 may have a first vertical distance from the surface of the first light-shielding layer 121 away from the base substrate 210. For all points on the surface of the light-sensitive structure 110 that is close to the first light-shielding layer 121, the first vertical distances may form a set, and the point corresponding to the minimum value in the set may be the position of the light-sensitive structure 110 that is closest to the first light-shielding layer 121, i.e., the closest position of the light-sensitive structure 110 from the first light-shielding layer 121. Similarly, each point on the surface of the light-sensitive structure 110 that is close to the second light-shielding layer 122 may have a second vertical distance from the surface of the second light-shielding layer 122 that faces toward the base substrate 210. For all points on the surface of the light-sensitive structure 110 that is close to the second light-shielding layer 122, the second vertical distances may form a set, and the point corresponding to the minimum value in the set may be the position of the light-sensitive structure 110 that is closest to the second light-shielding layer 122, i.e., the closest position of the light-sensitive structure 110 from the second light-shielding layer 122.

It should be understood that, through the arrangement described above, the first light-shielding section 131 may be closer to the first light-shielding layer 121 than the light-sensitive structure 110, and/or the second light-shielding section 132 may be closer to the second light-shielding layer 122 than the light-sensitive structure 110. Compared with the case where the light-sensitive structure 110 is closer to the first light-shielding layer 121 than the first light-shielding section 131 and the light-sensitive structure 110 is closer to the second light-shielding layer 122 than the second light-shielding section 132, the arrangement described above may be conducive to improving the degree to which the light-shielding structure 130 surrounds the light-sensitive structure 110. As such, the light-shielding structure 130 may be able to block more crosstalk light from being irradiated onto the light-sensitive structure 110 from the side, thereby improving the ability of the light-shielding structure 130 in blocking crosstalk light.

On the basis of the above technical schemes, in one embodiment, the orthogonal projection of the first light-shielding section 131 on the base substrate 210 and the orthogonal projection of the second light-shielding section 132 on the base substrate 210 may be at least partially overlapped or unoverlapped with each other.

In one embodiment, as shown in FIG. 1, FIG. 3, FIG. 5, FIGS. 6-9, 11 and FIGS. 13-19, the orthogonal projection of the first light-shielding section 131 on the base substrate 210 and the orthogonal projection of the second light-shielding section 132 on the base substrate 210 may be at least partially overlapped with each other. The advantage of the above arrangement is that the space occupied by the entirety of the first light-shielding section 131 and the second light-shielding section 132 (that is, the light-shielding structure 130) may be reduced, which is conducive to reducing the space occupied by the entire fingerprint recognition unit (at least including the light-sensitive structure 110 and light-shielding structure 130). When the designed area for fingerprint recognition units is constant, the above arrangement may be conducive to increasing the density of the fingerprint recognition unit, thereby improving the accuracy of fingerprint recognition.

In other embodiments, as shown in FIGS. 2, 4, and 10, the orthogonal projection of the first light-shielding section 131 on the base substrate 210 and the orthogonal projection of the second light-shielding section 132 on the base substrate 210 may not overlap with each other. The advantage of the above arrangement is as follows. In the structure of an existing array substrate, devices or wires may be disposed at the positions uncovered by either the first light-shielding section 131 or the second light-shielding section 132, and thus by making the first light-shielding section 131 and the second light-shielding section 132 unoverlapped with each other, the original setting positions of the devices or the wires in the existing array substrate may not need to be changed.

In some embodiments, the thin film transistor T may be a top-gate structure, and the light-shielding structure 130 may include a first light-shielding section, a second light-shielding section, and a third light-shielding section. The detailed structure of the array substrate is described below.

Figure 19:
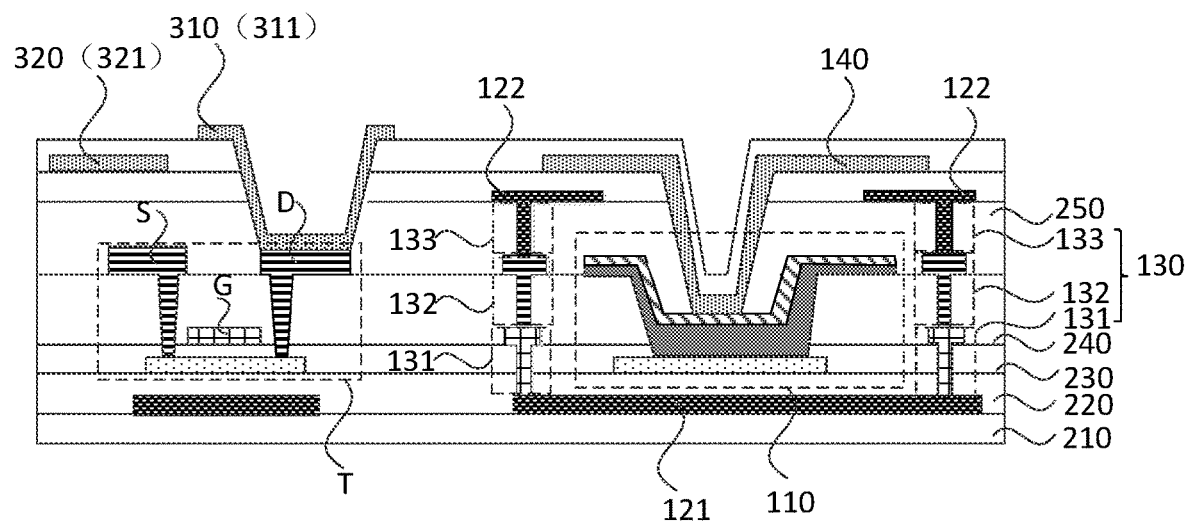
FIG. 19 illustrates a schematic structural diagram of another exemplary array substrate according to various embodiments of the present disclosure.
Figure 20:
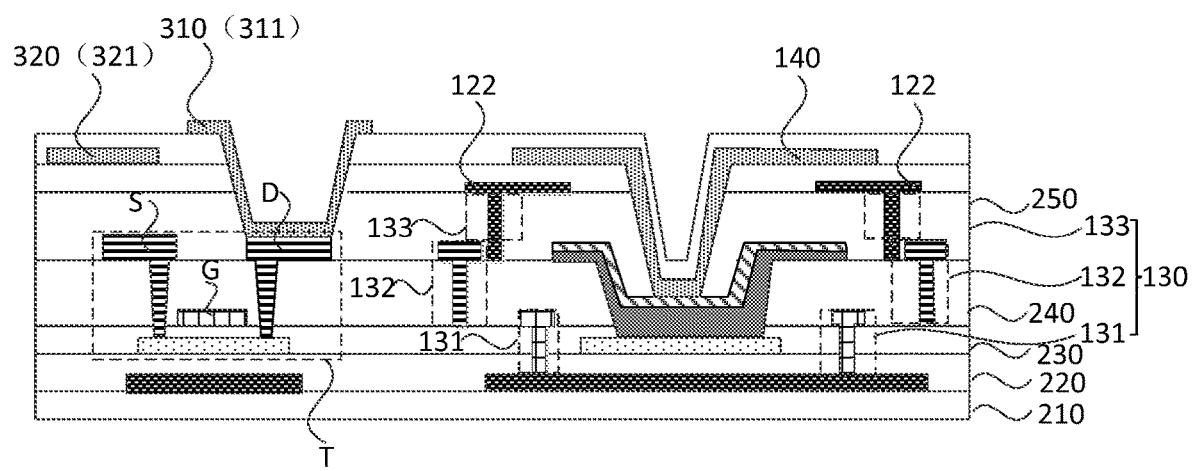
FIG. 20 illustrates a schematic structural diagram of another exemplary array substrate according to various embodiments of the present disclosure.
Figure 21:
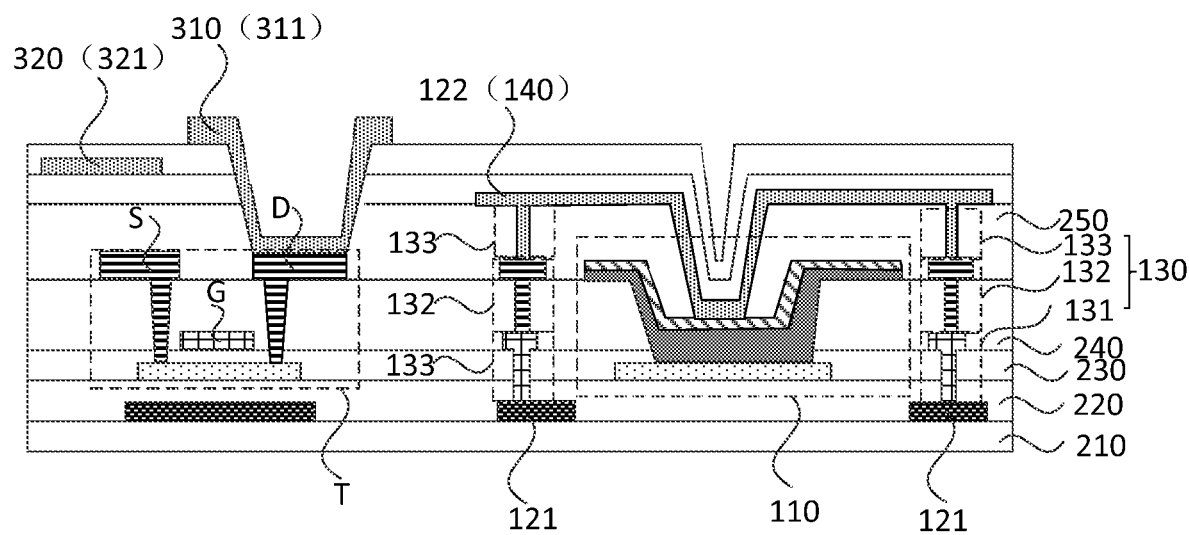
FIG. 21 illustrates a schematic structural diagram of an exemplary array substrate according to various embodiments of the present disclosure.

FIG. 19 illustrates a schematic structural diagram of an exemplary array substrate according to various embodiments of the present disclosure, FIG. 20 illustrates a schematic structural diagram of another exemplary array substrate according to various embodiments of the present disclosure, and FIG. 21 illustrates a schematic structural diagram of another exemplary array substrate according to various embodiments of the present disclosure. In the structure of the array substrate shown in FIG. 19 and FIG. 20, the first light-shielding layer is disposed on the side away from the touch object, and in the structure of the array substrate shown in FIG. 21, the first light-shielding layer is disposed on the side close to the touch object. Referring to FIGS. 19-21, in some embodiments, the array substrate may further include a buffer layer 220, a gate insulating layer 230, an interlayer dielectric layer 240, and a planarization layer 250.

The buffer layer 220 may be disposed on the side of the first light-shielding layer 121 away from the base substrate 210; the planarization layer 250 may be disposed on the side of the source-drain electrode layer that faces toward the second light-shielding layer 122; the interlayer dielectric layer 240 may be disposed between the planarization layer 250 and the gate insulating layer 230; and the gate insulating layer 230 may be disposed on the side of the gate electrode layer that faces toward the first light-shielding layer 121. The third light-shielding section may penetrate the planarization layer 250, and may be formed using a same fabrication process as the second light-shielding layer 122; the second light-shielding section 132 may penetrate the interlayer dielectric layer 240, and may be formed using a same fabrication process as the source-drain electrode layer; and the first light-shielding section may at least penetrate the gate insulating layer 230, and may be formed using a same fabrication process as the gate electrode layer.

For example, as shown in FIGS. 19-21, the first light-shielding section 131 may penetrate the gate insulating layer 230, or the first light-shielding section 131 may penetrate the gate insulating layer 230 and the buffer layer 220. It should be understood that, in the two scenarios described above, when the first light-shielding section 131 penetrates the gate insulating layer 230 and the buffer layer 220, the light-shielding structure 130 may substantially surround the light-sensitive structure 110, such that the light-shielding structure 130 may be able to block more crosstalk light from being irradiated onto the light-sensitive structure 110 from the side, thereby conducive to improving the accuracy of fingerprint recognition.

It should be noted that, by using a same fabrication process for forming the first light-shielding section 131 and the gate electrode layer, using a same fabrication process for forming the second light-shielding section 132 and the source-drain electrode layer, and using a same fabrication process for forming the third light-shielding section 133 and the second light-shielding layer 122, it may be ensured that the fabrication process of the first light-shielding section 131, the second light-shielding section 132, and the third light-shielding section 133 is compatible with the existing fabrication process of the array substrate, and it may also be ensured that the fabrication process of the first light-shielding section 131, the second light-shielding section 132, and the third light-shielding section 133 is simple.

In some embodiments, the thin film transistor T may be a bottom-gate structure, and the light-shielding structure 130 may include a first light-shielding section, a second light-shielding section, and a third light-shielding section. The detailed structure of the array substrate is described below.

Figure 22:
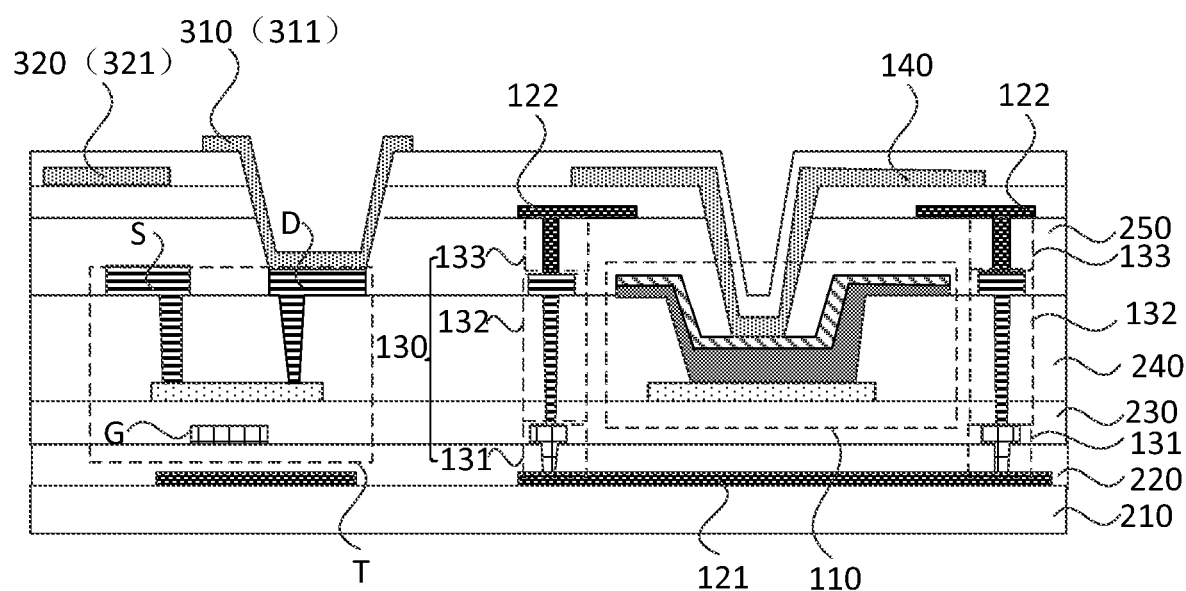
FIG. 22 illustrates a schematic structural diagram of another exemplary array substrate according to various embodiments of the present disclosure.
Figure 23:
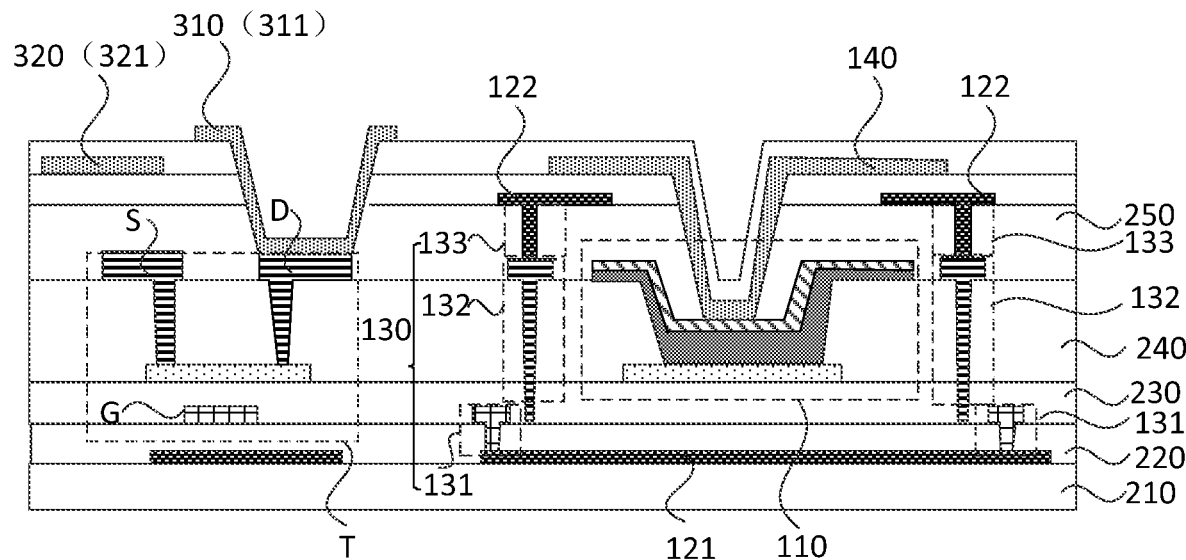
FIG. 23 illustrates a schematic structural diagram of another exemplary array substrate according to various embodiments of the present disclosure.
Figure 24:
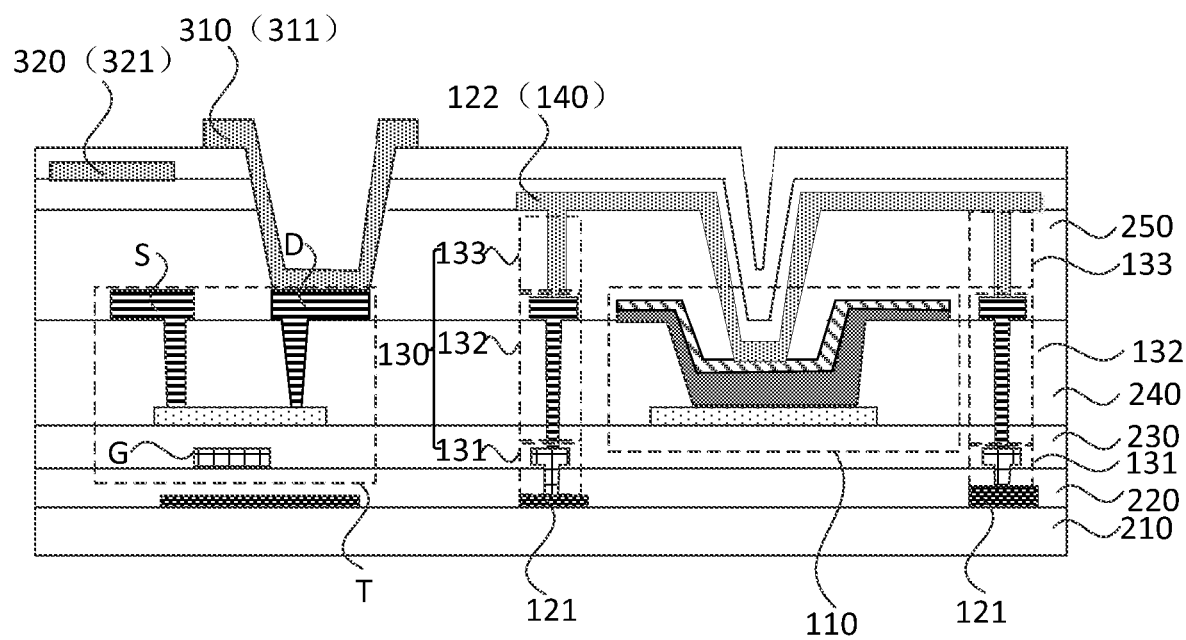
FIG. 24 illustrates a schematic structural diagram of another exemplary array substrate according to various embodiments of the present disclosure.

FIG. 22 illustrates a schematic structural diagram of an exemplary array substrate according to various embodiments of the present disclosure, FIG. 23 illustrates a schematic structural diagram of another exemplary array substrate according to various embodiments of the present disclosure, and FIG. 24 illustrates a schematic structural diagram of another exemplary array substrate according to various embodiments of the present disclosure. In the structure of the array substrate shown in FIG. 22 and FIG. 23, the first light-shielding layer is disposed on the side away from the touch object, and in the structure of the array substrate shown in FIG. 24, the first light-shielding layer is disposed on the side close to the touch object. Referring to FIGS. 22-24, in some embodiments, the array substrate may further include a buffer layer 220, a gate insulating layer 230, an interlayer dielectric layer 240, and a planarization layer 250.

The buffer layer 220 may be disposed on the side of the first light-shielding layer 121 away from the base substrate 210; the planarization layer 250 may be disposed on the side of the source-drain electrode layer that faces toward the second light-shielding layer 122; the interlayer dielectric layer 240 may be disposed between the planarization layer 250 and the gate insulating layer 230; and the gate insulating layer 230 may be disposed on the side of the gate electrode layer that faces toward the second light-shielding layer 122.

The third light-shielding section may penetrate the planarization layer 250, and may be formed using a same fabrication process as the second light-shielding layer 122; the second light-shielding section 132 may penetrate the interlayer dielectric layer 240 and the gate insulating layer 230, and may be formed using a same fabrication process as the source-drain electrode layer; and the first light-shielding section may penetrate the buffer layer 220, and may be formed using a same fabrication process as the gate electrode layer.

It should be noted that, by using a same fabrication process for forming the first light-shielding section 131 and the gate electrode layer, using a same fabrication process for forming the second light-shielding section 132 and the source-drain electrode layer, and using a same fabrication process for forming the third light-shielding section 133 and the second light-shielding layer 122, it may be ensured that the fabrication process of the first light-shielding section 131, the second light-shielding section 132, and the third light-shielding section 133 is compatible with the existing fabrication process of the array substrate, and it may also be ensured that the fabrication process of the first light-shielding section 131, the second light-shielding section 132, and the third light-shielding section 133 is simple.

Referring to FIGS. 19-24, on the basis of the above technical schemes, in one embodiment, in the direction perpendicular to the base substrate 210, the light-shielding structure 130 may include a first light-shielding section 131, a second light-shielding section 132, and a third light-shielding section 133. The first light-shielding section 131 and the second light-shielding section 132 may be disposed adjacent to each other, and the second light-shielding section 132 and the third light-shielding section 133 may be disposed adjacent to each other. In the direction perpendicular to the base substrate 210, the distance between the surface of the first light-shielding section 131 that is close to the first light-shielding layer 121 and the surface of the first light-shielding layer 121 away from the base substrate 210 may be smaller than the distance between the position of the light-sensitive structure 110 that is closest to the surface of the first light-shielding layer 121 and the surface of the first light-shielding layer 121 away from the base substrate 210, and the distance between the surface of the third light-shielding section 133 that is close to the second light-shielding layer 122 and the surface of the second light-shielding layer 122 that faces toward the base substrate 210 may be smaller than the distance between the position of the light-sensitive structure 110 that is closest to the surface of the second light-shielding layer 122 and the surface of the second light-shielding layer 122 that faces toward the base substrate 210.

The advantage of the above arrangement is the following. Through the arrangement described above, the first light-shielding section 131 may be closer to the first light-shielding layer 121 than the light-sensitive structure 110, and/or the third light-shielding section 133 may be closer to the second light-shielding layer 122 than the light-sensitive structure 110. Compared with the case where the light-sensitive structure 110 is closer to the first light-shielding layer 121 than the first light-shielding section 131 and the light-sensitive structure 110 is closer to the second light-shielding layer 122 than the third light-shielding section 133, the arrangement described above may be conducive to improving the degree to which the light-shielding structure 130 surrounds the light-sensitive structure 110. As such, the light-shielding structure 130 may be able to block more crosstalk light from being irradiated onto the light-sensitive structure 110 from the side, thereby improving the ability of the light-shielding structure 130 in blocking crosstalk light. It should be understood that, compared to dividing the light-shielding structure 130 into two light-shielding sections, dividing the light-shielding structure 130 into three light-shielding sections may be conducive to reducing the height of each light-shielding section, and thus reducing the depth of the perforation formed in the display panel during the fabrication process of the light-shielding sections. As such, the difficulty of the fabrication process of the light-shielding sections may be further reduced, thereby conducive to improving the production yield of the array substrate.

On the basis of the above technical schemes, in one embodiment, the orthogonal projections of at least two of the first light-shielding section 131, the second light-shielding section 132, and the third light-shielding section 133 on the base substrate 210 may be at least partially overlapped with each other. Alternatively, in some other embodiments, the orthogonal projections of the first light-shielding section 131, the second light-shielding section 132, and the third light-shielding section 133 on the substrate 210 may not overlap with each other.

In one embodiment, the orthogonal projections of any two of the first light-shielding section 131, the second light-shielding section 132, and the third light-shielding section 133 on the base substrate 210 may be at least partially overlapped with each other. For example, as shown in FIG. 23, the orthogonal projections of the second light-shielding section 132 and the third light-shielding section 133 may be at least partially overlapped with each other. In another example, the orthogonal projections of the first light-shielding section 131 and the third light-shielding section 133 may be at least partially overlapped with each other, or the orthogonal projections of the first light-shielding section 131 and the second light-shielding section 132 may be at least partially overlapped with each other. The advantage of the above arrangement is that the space occupied by the light-shielding structure 130 may be reduced, and when the designed area for fingerprint recognition units is constant, the above arrangement may be conducive to increasing the density of the fingerprint recognition unit, thereby improving the accuracy of fingerprint recognition.

In one embodiment, as shown in FIG. 19, FIG. 21, FIG. 22, and FIG. 14, the orthogonal projection of the first light-shielding section 131 on the base substrate 210, the orthogonal projection of the second light-shielding section 132 on the base substrate 210, and the orthogonal projection of the third light-shielding section 133 on the base substrate 210 may be at least partially overlapped with each other. The advantage of the above arrangement is that the space occupied by the light-shielding structure 130 may be further reduced, and when the designed area for fingerprint recognition units is constant, the above arrangement may be conducive to increasing the density of the fingerprint recognition unit, thereby improving the accuracy of fingerprint recognition.

In other embodiments, as shown in FIG. 20, the orthogonal projection of the first light-shielding section 131 on the base substrate 210, the orthogonal projection of the second light-shielding section 132 on the base substrate 210, and the orthogonal projection of the third light-shielding section 133 on the base substrate 210 may not overlap with each other. The advantage of the above arrangement is as follows. In the structure of an existing array substrate, devices or wires may be disposed at the positions uncovered by none of the first light-shielding section 131, the second light-shielding section 132, and the third light-shielding section 133, and thus by making the first light-shielding section 131, the second light-shielding section 132, and the third light-shielding section 133 unoverlapped with each other, the original setting positions of the devices or the wires in the existing array substrate may not need to be changed.

Further, referring to FIGS. 1-2, FIG. 5, FIG. 7, FIG. 9, FIG. 11, FIG. 13, FIG. 15, FIG. 17, FIGS. 19-20, and FIGS. 22-23, in one embodiment, the array substrate may also include a planarization layer 250, disposed between the light-sensitive structure 110 and the second light-shielding layer 122; a first electrode via 251 formed on the planarization layer 250; a first light-transmissive hole 1221 formed on the second light-shielding layer 122; and an electrode structure 140, electrically connected to the light-sensitive structure 110 through the first electrode via 251 and the first light-transmissive hole 1221. The orthogonal projection of the first electrode via 251 on the base substrate 210 and the orthogonal projection of the light-sensitive structure 110 on the base substrate may be at least partially overlapped with each other. The orthogonal projection of the first light-transmissive hole 1221 on the base substrate 210 and the orthogonal projection of the light-sensitive structure 110 on the base substrate 210 may be at least partially overlapped with each other.

In one embodiment, the electrode structure 140 may be electrically connected to the light-sensitive structure 110 and may be used to provide an operating voltage signal for the light-sensitive structure 110. The material of the electrode structure 140 may be indium tin oxide (ITO, which is a transparent conductive film), or any of antimony doped tin oxide (ATO). In other embodiments, the material of the electrode structure 140 may be any other transparent conductive material, which is not specifically limited in the present disclosure. In one embodiment, the array substrate may further include a pixel electrode and a common electrode, and the electrode structure 140 may be disposed on a same layer and also made of a same material as the pixel electrode and/or the common electrode. The advantage of the above arrangement is that the fabrication process of the electrode structure 140 can be ensured to match the fabrication process of the existing array substrate, thereby ensuring that the fabrication process of the electrode structure 140 is simple and also making the arrangement relationship of the film layers in array substrate simple and easy to achieve design requirements for a thin array substrate.

In one embodiment, the first electrode via 251 may provide a channel for the electrical connection between the electrode structure 140 and the light-sensitive structure 110. The first light-transmissive hole 1221 may provide a channel for the electrical connection between the electrode structure 140 and the light-sensitive structure 110 and also provide a channel for the light reflected by the touch object to be irradiated onto the light-sensitive structure 110.

It should be noted that, for the convenience and clarity of drawings, only in FIG. 1, the reference signs of the first electrode via 251 and the first light-transmissive hole 1221 are provided. In other drawings, the reference signs of the first electrode via 251 and the first light-transmissive hole 1221 are not provided, and those skilled in the art should understand the reference signs based on the signs shown in FIG. 1.

In one embodiment, referring to FIGS. 1-2, FIGS. 5-6, FIGS. 9-10, FIG. 13, FIG. 15, FIG. 17, FIGS. 19-20, and FIGS. 22-23, the orthogonal projection of the first light-shielding layer on the base substrate may cover the orthogonal projection of the light-sensitive structure on the base substrate. The advantage of the above arrangement is that the first light-shielding layer may be able to prevent the light emitted by the backlight source in the backlight module from being directly irradiated onto the light-sensitive structure 110 or prevent the outside light from being directly irradiated onto the light-sensitive structure 110.

In one embodiment, referring to FIGS. 3-4, FIG. 6, FIG. 8, FIGS. 11-12, FIG. 14, FIG. 16, FIG. 18, FIG. 21, and FIG. 24, a second light-transmissive hole 1211 may be formed on the first light-shielding layer, and the orthogonal projection of the second light-transmissive hole 1211 on the base substrate may be at least partially overlapped with the orthogonal projection of the light-sensitive structure on the base substrate.

For example, the second light-transmissive hole 1211 may provide a channel for the light reflected by the touch object to be irradiated onto the light-sensitive structure 110.

It should be noted that, for the convenience and clarity of drawings, only in FIG. 3, the reference sign of the second light-transmissive hole 1211 is provided. In other drawings, the reference sign of the second light-transmissive hole 1211 is not provided, and those skilled in the art should understand the reference sign based on the sign shown in FIG. 3.

In one embodiment, referring to FIGS. 3-4, FIG. 6, FIG. 8, FIGS. 11-12, FIG. 14, FIG. 16, FIG. 18, FIG. 21, and FIG. 24, the array substrate may further include a planarization layer 250 and an electrode structure 140. The planarization layer 250 may be disposed between the light-sensitive structure 110 and the second light-shielding layer 122, a second electrode via 252 may be formed in the planarization layer 250, and the electrode structure 140 and the light-sensitive structure 110 may be connected through the second electrode via 252. The electrode structure 140 may be multiplexed as the second light-shielding layer 122.

In one embodiment, the second electrode via 252 may provide a channel for the electrode structure 140 to be electrically connected to the light-sensitive structure 110. The electrode structure 140 may be made of a material including at least one of aluminum, molybdenum, silver, or any other light-shielding metals known to those skilled in the art. As such, because the electrode structure 140 is conductive, the electrode structure 140 may transmit the received operating voltage signal to the light-sensitive structure 110, and because the electrode structure 140 is opaque, the electrode structure 140 may the backlight source in the backlight module from being directly irradiated onto the light-sensitive structure 110 or prevent the outside light from being directly irradiated onto the light-sensitive structure 110.

It should be noted that, by multiplexing the electrode structure 140 as the second light-shielding layer 122, the fabrication process of the array substrate may be simplified, and the cost of the array substrate can be reduced.

In one embodiment, referring to FIGS. 3-4, FIG. 6, FIG. 8, FIGS. 11-12, FIG. 14, FIG. 16, FIG. 18, FIG. 21, and FIG. 24, the array substrate may further include a touch-control lead layer, disposed on the side of the planarization layer 250 that is away from the base substrate 210. The second light-shielding layer 122 and the touch-control lead layer may be formed using a same fabrication process.

In one embodiment, the touch-control lead layer may include a plurality of touch-control leads, and each touch-control lead may be electrically connected to at least one touch-control electrode (not shown in the drawing in the embodiments of the present disclosure) in the array substrate. The touch-control lead may be made of a material including at least one of aluminum, molybdenum, silver, or any other light-shielding metals known to those skilled in the art. It should be understood that, since the material of the touch lead is an opaque metal, the second light-shielding layer 122 can be formed by using the same fabrication process as the touch-control leads. The advantage of the above arrangement is that the fabrication process of the electrode structure 140 can be ensured to match the fabrication process of the existing array substrate, thereby ensuring that the fabrication process of the electrode structure 140 is simple and also making the arrangement relationship of the film layers in array substrate simple and easy to achieve design requirements for a thin array substrate.

In one embodiment, referring to FIGS. 3-4, FIG. 6, FIG. 8, FIGS. 11-12, FIG. 14, FIG. 16, FIG. 18, FIG. 21, and FIG. 24, the orthogonal projection of the second light-shielding layer on the base substrate may cover the orthogonal projection of the light-sensitive structure on the base substrate. The advantage of the above arrangement is that the second light-shielding layer may be able to prevent the light emitted by the backlight source in the backlight module from being directly irradiated onto the light-sensitive structure 110 or prevent the outside light from being directly irradiated onto the light-sensitive structure 110.

It should be noted that FIG. 7, FIG. 8, and FIGS. 15-16 only exemplarily illustrate that the light-shielding structure 130 is in contact with the first light-shielding layer 121; FIG. 1, FIG. 3, and FIG. 9 only exemplarily illustrate that the light-shielding structure 130 is in contact with the second light-shielding layer 122; and FIG. 2, FIGS. 4-6, FIG. 10, FIGS. 12-14, and FIGS. 17-24 only exemplarily illustrate that the light-shielding structure 130 is in contact with both the first light-shielding layer 121 and the second light-shielding layer 122. However, these exemplary illustrations are not intended to limit the structure of the array substrate in the present application. In other embodiments, the light-shielding structure 130 not in contact with the first light-shielding layer 121 or the second light-shielding layer 122 may be provided. Whether the light-shielding structure 130 is in contact with the first light-shielding layer 121 and/or the second light-shielding layer 122 may be determined by those skilled in the art according to the actual situation.

The present disclosure also provides a display panel. The display panel may include an array substrate according to various embodiments of the present disclosure. Therefore, the display panel may also have the beneficial effects of the array substrate provided by the above embodiments. For the detailed advantages of the display panel, reference may be made to the corresponding content in the above embodiments, and the details will not be described herein again.

Figure 25:
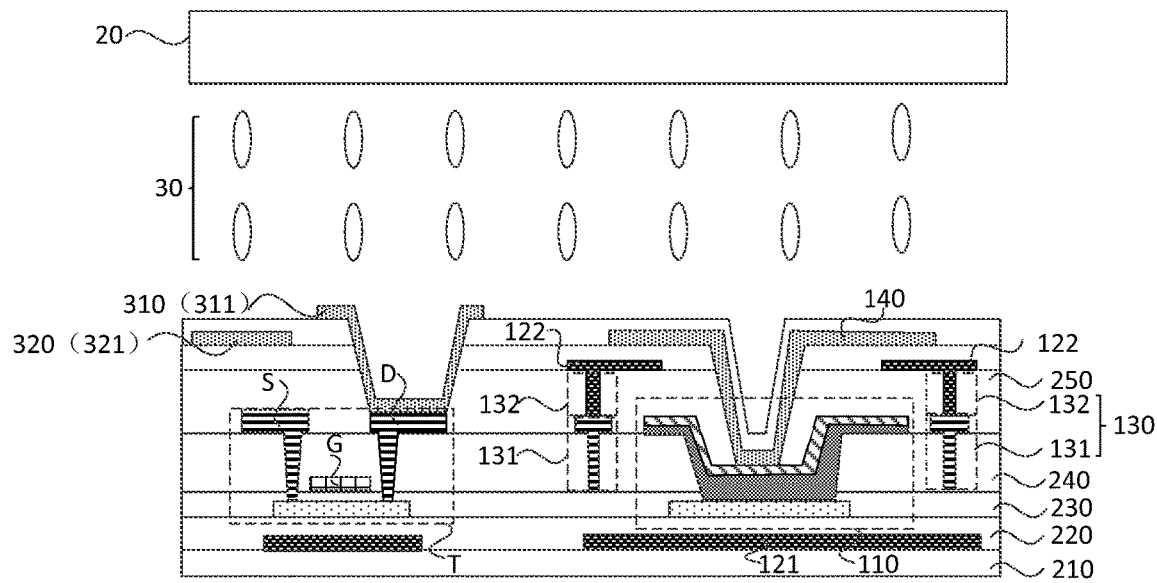
FIG. 25 illustrates a schematic structural diagram of an exemplary display panel according to various embodiments of the present disclosure.

FIG. 25 illustrates a schematic structural diagram of an exemplary display panel according to various embodiments of the present disclosure. Referring to FIG. 25, the display panel may include a color film substrate 20 and an array substrate that are disposed opposite to each other. The array substrate may be disposed close to a backlight module (not shown in FIG. 25). In one embodiment, the array substrate included in the display panel may be any array substrate according to FIGS. 1-2, FIG. 5, FIG. 7, FIG. 9, FIG. 11, FIG. 13, FIG. 15, FIG. 17, FIGS. 19-20, and FIGS. 22-23. FIG. 25 exemplarily illustrates that the display panel includes the array substrate shown in FIG. 1.

Referring to FIG. 25, in one embodiment, in the display panel, the surface of the color film substrate 20 away from the base substrate may be the light-emitting surface of the display panel. During the fingerprint recognition process, the touch object may be placed on the side of the color film substrate 20 away from the array substrate, and the light reflected by the touch object may pass through relevant film layers in the color film substrate 20, the liquid crystal 30, and the array substrate, and may be irradiated onto the light-sensitive structure 110. The first light-shielding layer 121 and the light-shielding structure 130 may be able to prevent the light emitted from a backlight source in the backlight module from being directly irradiated onto the light-sensitive structure 110. The second light-shielding layer 122 and the light-shielding structure 130 may be able to prevent crosstalk light of adjacent fingerprint recognition regions from being irradiated onto the light-sensitive structure 110.

Figure 26:
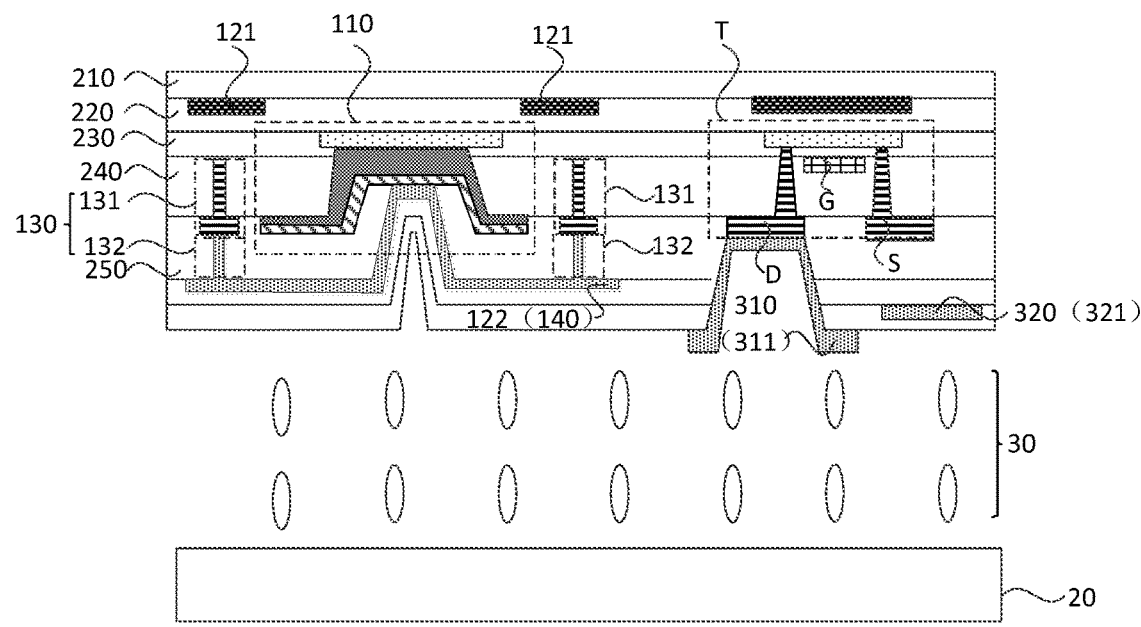
FIG. 26 illustrates a schematic structural diagram of another exemplary display panel according to various embodiments of the present disclosure.

FIG. 26 illustrates a schematic structural diagram of another exemplary display panel according to various embodiments of the present disclosure. Referring to FIG. 26, the display panel may include a color film substrate 20 and an array substrate that are disposed opposite to each other. The color film substrate 20 may be disposed close to a backlight module (not shown in FIG. 25). In one embodiment, the array substrate included in the display panel may be any array substrate according to FIGS. 3-4, FIG. 6, FIG. 8, FIGS. 11-12, FIG. 14, FIG. 16, FIG. 18, FIG. 21, and FIG. 24. FIG. 26 exemplarily illustrates that the display panel includes the array substrate shown in FIG. 3.

Referring to FIG. 26, in one embodiment, in the display panel, the surface of the array substrate away from the color film substrate 20 may be the light-emitting surface of the display panel. During the fingerprint recognition process, the touch object may be placed on the side of the array substrate away from the color film substrate 20, and the light reflected by the touch object may only need to pass through the base substrate and the buffer layer to reach the light-sensitive structure 110. Compared to the structure of the display panel shown in FIG. 25, because the number of the films layers that the reflected light passes through is reduced, the loss of the reflected light may be reduced, which may be conducive to improving the accuracy of fingerprint recognition. The first light-shielding layer 121 and the light-shielding structure 130 may be able to prevent external light from being directly irradiated onto the light-sensitive structure 110, and may also be able to prevent crosstalk light of adjacent fingerprint recognition regions from being irradiated onto the light-sensitive structure 110. The second light-shielding layer 122 and the light-shielding structure 130 may be able to prevent the crosstalk light of the adjacent fingerprint recognition regions from being directly irradiated onto the light-sensitive structure 110, and may also be able to prevent the light emitted by the backlight source in the backlight module from being directly irradiated onto the light-sensitive structure 110.

It should be noted that FIG. 25 and FIG. 26 only exemplarily illustrate the cases where the display panel is a liquid crystal display panel containing liquid crystals 30, but these exemplary illustrations are not intended to limit the implementation of the display panel of the present application. In other embodiments, the display panel may be an organic light-emitting diode (OLED) display panel, or any other appropriate display panel. The detailed implementation manner of the display panel may be determined according to the actual situation.

Further, the present disclosure also provides a display device. The display device may include a display panel according to various embodiments of the present disclosure. Therefore, the display device may also have the beneficial effects of the array substrate provided by the above embodiments. For the detailed advantages of the display device, reference may be made to the corresponding content in the above embodiments, and the details will not be described herein again. As an example, the display device may be any appropriate electronic display device such as a car display screen, a mobile phone, a computer, a television, etc., which are not specifically limited in the present disclosure.

Compared to existing array substrates, display panels, and display devices, the disclosed array substrate, display panel, and display device may demonstrate the following exemplary advantages.

According to the disclosed array substrate, display panel, and display device, by disposing a light-shielding structure to surround the light-sensitive structure, the light-shielding structure may be able to block the crosstalk light that is incident on the light-sensitive structure from the side of the light-sensitive structure, thereby preventing the crosstalk light from being irradiated onto the light-sensitive structure, preventing the light-sensitive structure from being interfered, solving the problem that the light-sensitive structure is interfered by crosstalk light, and improving the accuracy of fingerprint recognition. In the meantime, by setting the light-shielding structure to include at least a first light-shielding section and a second light-shielding section, and forming the first light-shielding section and the second light-shielding section using different fabrication processes, the difficulty of the fabrication process of the light-shielding structure may be reduced, the process of preparing the light-shielding structure may be simplified, thereby conducive to improving the production yield of the array substrate.

The various embodiments in the present disclosure are described in a progressive manner, and each embodiment focuses on differences from other embodiments, and the same or similar parts between the various embodiments may be referred to each other.

The above detailed descriptions only illustrate certain exemplary embodiments of the present disclosure, and are not intended to limit the scope of the present disclosure. Those skilled in the art can understand the specification as whole and technical features in the various embodiments can be combined into other embodiments understandable to those persons of ordinary skill in the art. Any equivalent or modification thereof, without departing from the spirit and principle of the present disclosure, falls within the true scope of the present disclosure.

What is claimed is:

1. An array substrate, comprising:
    a base substrate;
    a first light-shielding layer, disposed on a side of the base substrate;
    a light-sensitive structure, disposed on a side of the first light-shielding layer away from the base substrate;
    a second light-shielding layer, disposed on a side of the light-sensitive structure away from the base substrate; and
    a light-shielding structure, disposed between the first light-shielding layer and the second light-shielding layer, wherein:
        an orthogonal projection of the light-shielding structure on the base substrate surrounds an orthogonal projection of the light-sensitive structure on the base substrate, and
        in a direction perpendicular to the base substrate, the light-shielding structure at least includes a first light-shielding section and a second light-shielding section, wherein:
            the first light-shielding section is disposed on a side close to the first light-shielding layer, and
            the first light-shielding section and the second light-shielding section are formed by different fabrication processes.

2. The array substrate according to claim 1, further including:
    a gate electrode layer and a source-drain electrode layer, wherein:
        the gate electrode layer is disposed between the base substrate and the source-drain electrode layer, and
        the source-drain electrode layer is disposed on a side of the second light-shielding layer that is adjacent to the base substrate; and
    a plurality of driving circuits, each driving circuit of the plurality of driving circuits including a thin film transistor, wherein:
        the thin film transistor includes a gate, a source, and a drain with the gate disposed in the gate electrode layer, and the source and the drain disposed in the source-drain electrode layer;
    wherein:
        the first light-shielding section is formed by a same fabrication process as one of the gate electrode layer and the source-drain electrode layer.

3. The array substrate according to claim 2, wherein:
    the first light-shielding section and the second light-shielding section are disposed adjacent to each other;
    in the direction perpendicular to the base substrate, a distance between a surface of the first light-shielding section that is adjacent to the first light-shielding layer and a surface of the first light-shielding layer away from the base substrate is smaller than a distance between a position of the light-sensitive structure that is closest to the first light-shielding layer and the surface of the first light-shielding layer away from the base substrate, and/or a distance of the second light-shielding section that is adjacent to the second light-shielding layer and a surface of the second light-shielding layer that faces toward the base substrate is smaller than a distance between a position of the light-sensitive structure that is closest to the second light-shielding layer and the surface of the second light-shielding layer that faces toward the base substrate.

4. The array substrate according to claim 2, further including a buffer layer, a gate insulating layer, an interlayer dielectric layer, and a planarization layer, wherein:
    the buffer layer is disposed on the side of the first light-shielding layer away from the base substrate;
    the planarization layer is disposed on a side of the source-drain electrode layer that faces toward the second light-shielding layer;
    the interlayer dielectric layer is disposed between the planarization layer and the gate insulating layer; and
    the gate insulating layer is disposed on a side of the gate electrode layer that faces toward one of the first light-shielding layer and the second light-shielding layer.

5. The array substrate according to claim 4, wherein:
    the second light-shielding section penetrates the planarization layer, and is formed by a same fabrication process as the second light-shielding layer; and
    the first light-shielding section at least penetrates the interlayer dielectric layer, and is formed by a same fabrication process as the source-drain electrode layer.

6. The array substrate according to claim 4, wherein:
    when the gate insulating layer is disposed on the side of the gate electrode layer that faces toward the first light-shielding layer, the second light-shielding section penetrates the planarization layer and the interlayer dielectric layer, and is formed by a same fabrication process as the second light-shielding layer; and the first light-shielding section at least penetrates the gate insulating layer, and is formed by a same fabrication process as the gate electrode layer; and
    when the gate insulating layer is disposed on the side of the gate electrode layer that faces toward the second light-shielding layer, the second light-shielding section penetrates the planarization layer, the interlayer dielectric layer, and the gate insulating layer, and is formed by a same fabrication process as the second light-shielding layer; and the first light-shielding section penetrates the buffer layer, and is formed by a same fabrication process as the gate electrode layer.

7. The array substrate according to claim 4, wherein:
    when the gate insulating layer is disposed on the side of the gate electrode layer that faces toward the first light-shielding layer, the second light-shielding section penetrates the interlayer dielectric layer, and is formed by a same fabrication process as the source-drain electrode layer; and the first light-shielding section at least penetrates the gate insulating layer, and is formed by a same fabrication process as the gate electrode layer; and when the gate insulating layer is disposed on the side of the gate electrode layer that faces toward the second light-shielding layer, the second light-shielding section penetrates the interlayer dielectric layer and the gate insulating layer, and is formed by a same fabrication process as the source-drain electrode layer; and the first light-shielding section penetrates the buffer layer, and is formed by a same fabrication process as the gate electrode layer.

8. The array substrate according to claim 2, further including a gate insulating layer, an interlayer dielectric layer, and a planarization layer, wherein:

the planarization layer is disposed on a side of the source-drain electrode layer that faces toward the second light-shielding layer;

the interlayer dielectric layer is disposed between the planarization layer and the gate insulating layer;

the gate insulating layer is disposed on a side of the gate electrode layer away from the base substrate;

the second light-shielding section penetrates the planarization layer, and is formed by a same fabrication process as the second light-shielding layer;

the first light-shielding section at least penetrates the interlayer dielectric layer, and is formed by a same fabrication process as the source-drain electrode layer; and a portion of the gate electrode layer directly opposite to the light-sensitive structure is multiplexed as the first light-shielding layer.

9. The array substrate according to claim 2, wherein:

an orthogonal projection of the first light-shielding section on the base substrate and an orthogonal projection of the second light-shielding section on the base substrate are either at least partially overlapped or unoverlapped with each other.

10. The array substrate according to claim 2, wherein:

in the direction perpendicular to the base substrate, the light-shielding structure further includes a third light-shielding section, wherein the first light-shielding section is disposed adjacent to the second light-shielding section, and the second light-shielding section is disposed adjacent to the third light-shielding section;

in the direction perpendicular to the base substrate, a distance between a surface of the first light-shielding section that is adjacent to the first light-shielding layer and a surface of the first light-shielding layer away from the base substrate is smaller than a distance between a position of the light-sensitive structure that is closest to the first light-shielding layer and the surface of the first light-shielding layer away from the base substrate, and a distance of the third light-shielding section that is adjacent to the second light-shielding layer and a surface of the second light-shielding layer that faces toward the base substrate is smaller than a distance between a position of the light-sensitive structure that is closest to the second light-shielding layer and the surface of the second light-shielding layer that faces toward the base substrate.

11. The array substrate according to claim 10, further including a buffer layer, a gate insulating layer, an interlayer dielectric layer, and a planarization layer, wherein:

the buffer layer is disposed on the side of the first light-shielding layer away from the base substrate; the planarization layer is disposed on a side of the source-drain electrode layer that faces toward the second light-shielding layer; the interlayer dielectric layer is disposed between the planarization layer and the gate insulating layer; and the gate insulating layer is disposed on a side of the gate electrode layer that faces toward the first light-shielding layer; the third light-shielding section penetrates the planarization layer, and is formed by a same fabrication process as the second light-shielding layer; the second light-shielding section penetrates the interlayer dielectric layer, and is formed by a same fabrication process as the source-drain electrode layer; and the first light-shielding section at least penetrates the gate insulating layer and is formed by a same fabrication process as the gate electrode layer; or the gate insulating layer is disposed on a side of the gate electrode layer that faces toward the second light-shielding layer; the third light-shielding section penetrates the planarization layer, and is formed by a same fabrication process as the second light-shielding layer; the second light-shielding section penetrates the interlayer dielectric layer and the gate insulating layer, and is formed by a same fabrication process as the source-drain electrode layer; and the first light-shielding section penetrates the buffer layer and is formed by a same fabrication process as the gate electrode layer.

12. The array substrate according to claim 10, wherein:

orthogonal projections of at least two of the first light-shielding section, the second light-shielding section, and the third light-shielding section on the base substrate are at least partially overlapped with each other; or the orthogonal projections of the first light-shielding section, the second light-shielding section, and the third light-shielding section on the base substrate are unoverlapped with each other.

13. The array substrate according to claim 1, further including:

a planarization layer, disposed between the light-sensitive structure and the second light-shielding layer, wherein a first electrode via is formed in the planarization layer, and a first light-transmissive hole is formed in the second light-shielding layer; and an electrode structure, electrically connected to the light-sensitive structure through the first electrode via and the first light-transmissive hole, wherein:

an orthogonal projection of the first electrode via on the base substrate is at least partially overlapped with an orthogonal projection of the light-sensitive structure on the base substrate, and an orthogonal projection of the first light-transmissive hole on the base substrate is at least partially overlapped with the orthogonal projection of the light-sensitive structure on the base substrate.

14. The array substrate according to claim 13, wherein:

the orthogonal projection of the first light-shielding layer on the base substrate covers the orthogonal projection of the light-sensitive structure on the base substrate.

15. The array substrate according to claim 1, wherein:

a second light-transmissive hole is formed on the first light-shielding layer, wherein an orthogonal projection of the second light-transmissive hole is at least partially overlapped with an orthogonal projection of the light-sensitive structure on the base substrate.

16. The array substrate according to claim 15, further including:
- a planarization layer, disposed between the light-sensitive structure and the second light-shielding layer, wherein a second electrode via is formed on the planarization layer; and
- an electrode structure, connected to the light-sensitive structure through the second electrode via, wherein:
  - the electrode structure is multiplexed as the second light-shielding layer.

17. The array substrate according to claim 16, further including:
- a touch-control lead layer, disposed on a side of the planarization layer that is away from the planarization layer, wherein:
  - the second light-shielding layer and the touch-control lead layer are formed by a same fabrication process.

18. The array substrate according to claim 15, wherein:
- the orthogonal projection of the second light-shielding layer on the base substrate covers the orthogonal projection of the light-sensitive structure on the base substrate.

19. A display panel, comprising an array substrate, wherein the array substrate includes:
- a base substrate and a first light-shielding layer disposed on a side of the base substrate;
- a light-sensitive structure, disposed on a side of the first light-shielding layer away from the base substrate;
- a second light-shielding layer, disposed on a side of the light-sensitive structure away from the base substrate; and
- a light-shielding structure, disposed between the first light-shielding layer and the second light-shielding layer, wherein:
  - an orthogonal projection of the light-shielding structure on the base substrate surrounds an orthogonal projection of the light-sensitive structure on the base substrate, and
  - in a direction perpendicular to the base substrate, the light-shielding structure at least includes a first light-shielding section and a second light-shielding section, wherein:
    - the first light-shielding section is disposed on a side close to the first light-shielding layer, and
    - the first light-shielding section and the second light-shielding section are formed by different fabrication processes.

20. A display device, comprising a display panel including an array substrate, wherein the array substrate includes:
- a base substrate and a first light-shielding layer disposed on a side of the base substrate;
- a light-sensitive structure, disposed on a side of the first light-shielding layer away from the base substrate;
- a second light-shielding layer, disposed on a side of the light-sensitive structure away from the base substrate; and
- a light-shielding structure, disposed between the first light-shielding layer and the second light-shielding layer, wherein:
  - an orthogonal projection of the light-shielding structure on the base substrate surrounds an orthogonal projection of the light-sensitive structure on the base substrate, and
  - in a direction perpendicular to the base substrate, the light-shielding structure at least includes a first light-shielding section and a second light-shielding section, wherein:
    - the first light-shielding section is disposed on a side close to the first light-shielding layer, and
    - the first light-shielding section and the second light-shielding section are formed by different fabrication processes.

* * * * *